US009884294B2

(12) United States Patent
Krutka et al.

(10) Patent No.: US 9,884,294 B2
(45) Date of Patent: Feb. 6, 2018

(54) METHOD AND SYSTEM TO THERMALLY REGENERATE A SORBENT

(71) Applicant: ADA-ES, INC., Highlands Ranch, CO (US)

(72) Inventors: Holly Krutka, Centennial, CO (US); William Morris, Evergreen, CO (US); Sharon Sjostrom, Sedalia, CO (US); Travis Starns, Parker, CO (US)

(73) Assignee: ADA-ES, Inc., Highlands Ranch, CO (US)

( * ) Notice: Subject to any disclaimer, the term of this patent is extended or adjusted under 35 U.S.C. 154(b) by 546 days.

(21) Appl. No.: 14/057,848

(22) Filed: Oct. 18, 2013

(65) Prior Publication Data
US 2014/0112856 A1    Apr. 24, 2014

Related U.S. Application Data

(60) Provisional application No. 61/716,128, filed on Oct. 19, 2012.

(51) Int. Cl.
| | |
|---|---|
| *B01D 53/56* | (2006.01) |
| *B01D 53/96* | (2006.01) |
| *B01D 53/04* | (2006.01) |
| *B01D 53/047* | (2006.01) |
| *B01D 53/08* | (2006.01) |

(52) U.S. Cl.
CPC ........... *B01D 53/96* (2013.01); *B01D 53/047* (2013.01); *B01D 53/0462* (2013.01); *B01D 53/08* (2013.01); *B01D 2253/206* (2013.01); *B01D 2257/504* (2013.01); *B01D 2258/0283* (2013.01); *Y02C 10/08* (2013.01)

(58) Field of Classification Search
None
See application file for complete search history.

(56) References Cited

U.S. PATENT DOCUMENTS

| | | | |
|---|---|---|---|
| 4,419,245 A | 12/1983 | Barrett et al. | |
| 4,427,794 A | 1/1984 | Lange et al. | |
| 4,444,961 A | 4/1984 | Timm | |
| 5,223,145 A * | 6/1993 | Markovs | B01D 15/00 210/673 |
| 6,579,507 B2 | 6/2003 | Pahlman et al. | |
| 7,776,296 B2 | 8/2010 | Sarlis | |
| 2006/0173083 A1 | 8/2006 | Klipper et al. | |
| 2010/0263534 A1 | 10/2010 | Chuang | |
| 2011/0088550 A1 | 4/2011 | Tirio | |
| 2012/0058032 A1 | 3/2012 | Lackner et al. | |

(Continued)

FOREIGN PATENT DOCUMENTS

| | | |
|---|---|---|
| EP | 0046535 | 3/1982 |
| WO | WO 93/12167 | 6/1993 |

OTHER PUBLICATIONS

Weber et al., "The Absorption of Carbon Dioxide by Weak Base Ion Exchange Resins", AIChE Journal, vol. 16, No. 4, Jul. 1970, pp. 609-614.*

(Continued)

*Primary Examiner* — Anita Nassiri Motlagh
(74) *Attorney, Agent, or Firm* — Sheridan Ross P.C.

(57) ABSTRACT

The present disclosure is directed to a high temperature method to adsorb carbon dioxide onto an ion-exchange resin and/or regenerate the carbon dioxide-loaded ion-exchange resins.

29 Claims, 10 Drawing Sheets

(56) References Cited

U.S. PATENT DOCUMENTS

| | | |
|---|---|---|
| 2012/0228553 A1 | 9/2012 | Tirio |
| 2012/0258029 A1* | 10/2012 | Krutka .................. B01D 53/12 423/210 |
| 2012/0316955 A1 | 12/2012 | Panguluri et al. |
| 2013/0291721 A1 | 11/2013 | Silverman et al. |

OTHER PUBLICATIONS

U.S. Appl. No. 14/032,030, filed Sep. 19, 2013, Krutka et al.

Choi et al. "Adsorbent Materials for Carbon Dioxide Capture from Large Anthropogenic Point Sources," ChemSusChem, Sep. 2009, vol. 2, No. 9, pp. 796-854.

Drage et al. "Developing strategies for the regeneration of polyethylenimine based CO2 adsorbents," Energy Procedia, Feb. 2009, vol. 1, No. 1, pp. 875-880.

Gray et al. "Parametric Study of Solid Amine Sorbents for the Capture of Carbon Dioxide," Energy & Fuels, Oct. 2009, vol. 23, No. 10, pp. 4840-4844.

Gray et al. "Systematic Design of Immobilized Solid Amine Sorbents for the Capture of Carbon Dioxide," Sixth Annual Conference on Carbon Capture and Sequestration, Pittsburgh, PA, May 2007, 22 pages.

Samanta et al. "Post-Combustion CO2 Capture Using Solid Sorbents: A Review," Industrial & Engineering Cheistry Research, Feb. 2012, vol. 51, No. 4, pp. 1438-1463.

Sjostrom et al. "Evaluation of solid sorbents as a retrofit technology for CO2 capture," Fuel, 2010, vol. 89, No. 6, pp. 1298-1306.

Background of the invention for the above captioned application (previously provided).

International Search Report and Written Opinion for International Patent Application No. PCT/US13/65675, dated Feb. 20, 2014, 14 pages.

International Preliminary Report on Patentability for International (PCT) Patent Application No. PCT/US20113/065675, dated Apr. 30, 2015 13 pages.

* cited by examiner

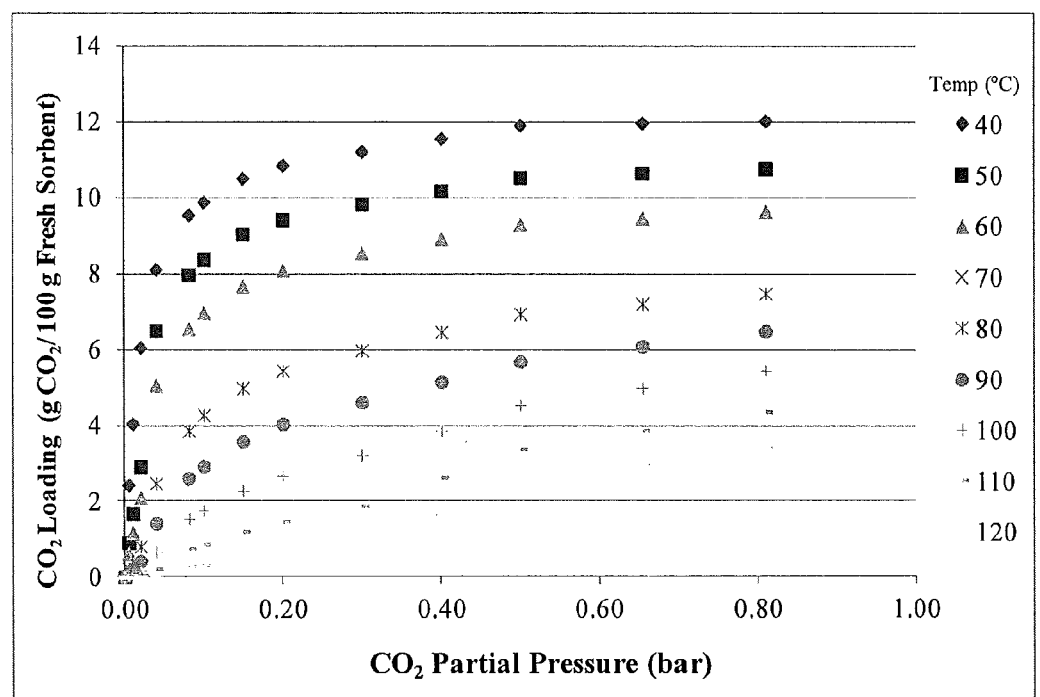
Figure 8: $CO_2$ Isotherms for an Amine Functionalized Ion Exchange Resin

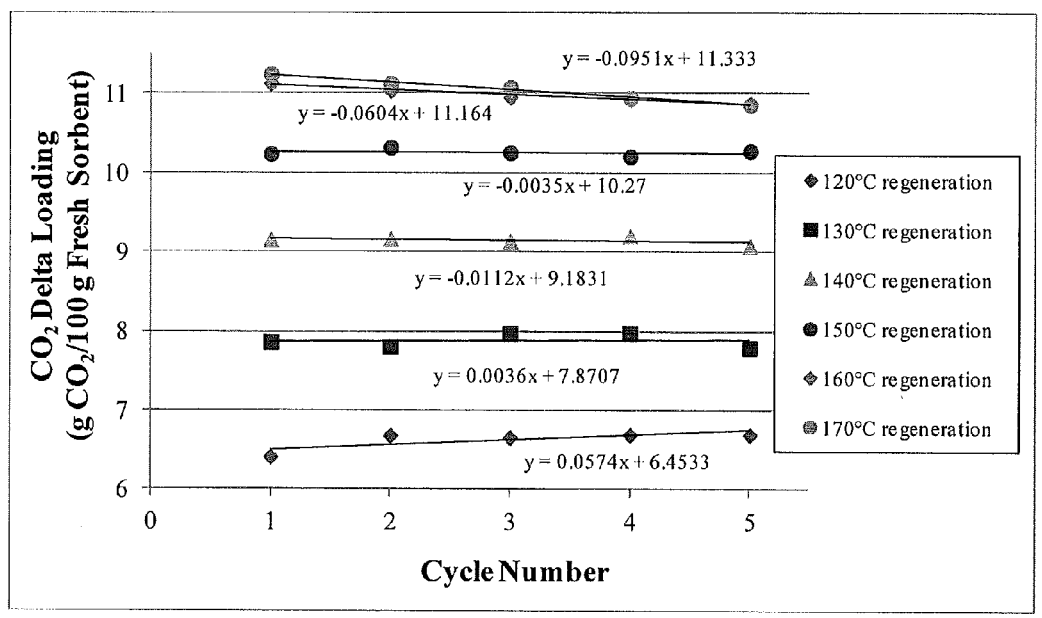
Figure 9: CO₂ Delta Loading at Regeneration Temperatures between 120°C and 170°C

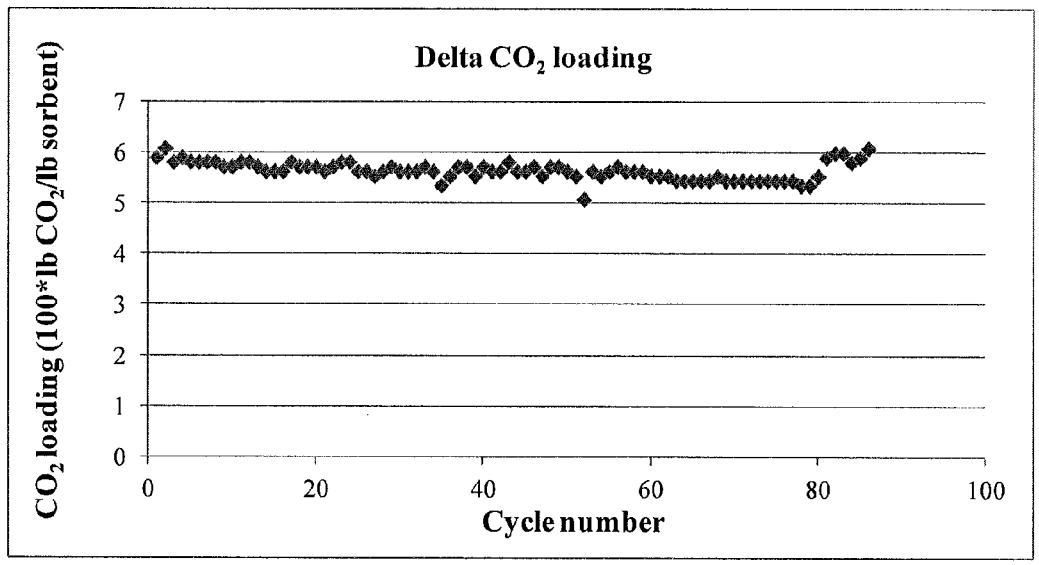
Figure10: Delta $CO_2$ Loading for Multiple Cycles

METHOD AND SYSTEM TO THERMALLY REGENERATE A SORBENT

CROSS REFERENCE TO RELATED APPLICATION

The present application claims the benefits of U.S. Provisional Application Ser. No. 61/716,128, filed Oct. 19, 2012, entitled "INCREASED TEMPERATURE OF REGENERATION FOR CO2 CAPTURE WITH ION-EXCHANGE RESINS", which is incorporated herein by this reference in its entirety.

Cross-reference is made to U.S. application Ser. No. 13/441,119, filed Apr. 11, 2012, Ser. No. 13/861,183, filed Apr. 11, 2013, and Ser. No. 14/032,030, filed Sep. 19, 2013, each of which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. DE-FE0004343 awarded by the U.S. Department of Energy.

FIELD

The disclosure relates generally to waste gas treatment and particularly to recycle of sorbents used in waste gas treatment.

BACKGROUND $CO_2$ capture and sequestration is one of the only feasible means for significantly reducing $CO_2$ emissions from coal-fired power plants. One promising method of carrying out $CO_2$ capture is the use of dry adsorbents in a temperature swing process. Potential sorbents are being developed and evaluated extensively in the industry.

One of the most common types of solid adsorbents are those that are functionalized with an amine. Within the subset of supported amines, one material of interest is an ion-exchange resin that has been functionalized with an amine. It is known to use an adsorption temperature of 20° C. to 30° C. and regeneration temperatures in the range of 80° C. to 100° C. for amine functionalized ion-exchange resins.

Although sorbents that utilize an amine have demonstrated promising traits related to $CO_2$ capture, the upper bounds of regeneration temperature have been low because amines tend to degrade at elevated temperatures. Adsorption and regeneration conditions affect the overall cost for $CO_2$ capture. Operating a $CO_2$ capture system within previously disclosed temperature ranges of 20° C. to 30° C., with regeneration temperatures of 80° C. to 100° C., results in a significant energy penalty due to the required cooling of flue gases.

A need therefore exists in the art for an amine-based sorbent having superior degradation characteristics that can withstand higher operating temperatures.

SUMMARY

These and other needs are addressed by the various aspects, embodiments, and configurations of the present disclosure. The present disclosure is directed to a method and system by which sorbents, particularly amine-based sorbents, can be regenerated at relatively high temperatures and, optionally, cleansed of heat stable salts, without negatively or adversely impacting the sorbent structure or the utility of its functional sites.

The disclosure is directed to a method that can include the steps:

(a) contacting an ion-exchange resin with the a target component-containing gas stream;

(b) absorbing at least a portion of the target component from the target component-containing gas stream onto the ion-exchange resin at an absorption temperature of at least 20° C. to form a target component-loaded resin;

(c) regenerating the target component-containing resin by removing, from the target component-containing resin, the target component at a sorbent regeneration temperature of more than 100° C. to form a regenerated ion-exchange resin; and (d) recycling the regenerated ion-exchange resin to the contacting step.

The target component-containing gas stream can include one or more acid gases that will collect on the ion-exchange resin as an acid gas and/or heat stable salt thereof. After removal of the target component from the ion-exchange resin, the ion-exchange resin can still include the acid gas and/or heat stable salt thereof. To remove these components, the ion-exchange resin can be contacted with a regeneration solution to form a fully treated ion-exchange resin for recycle.

The disclosure is directed to a system that can include:

(a) a gas component separator configured to (a) receive a gas stream including a target gas component and one or more acid gas(es) different from the target gas component, and (b) contact the gas stream with an ion-exchange resin to remove some or all of the target gas component to form a purified gas stream and a loaded ion-exchange resin, the loaded ion-exchange resin also removing some or all of the acid gas(es);

(b) a high temperature ion-exchange resin regenerator configured to remove most or all of the target gas component from the loaded ion-exchange resin to form a lean ion-exchange resin, which still includes most or all of the acid gas(es) and/or a salt thereof; and (c) an optional regeneration vessel configured to contact the lean ion-exchange resin with a regeneration solution to remove most or all of the acid gas(es) and/or salt(s) thereof and form a fully treated ion-exchange resin for recycle to the gas component separator.

The target gas component can be a carbon oxide, particularly carbon dioxide.

The sorbent regeneration temperature can be at least about 110° C. and even at least about 120° C.

The target component absorption temperature can be at least about 30° C., at least about 35° C., at least about 40° C., and even at least about 50° C.

The acid gas can be one or more of a sulfur oxide, a nitrogen oxide and hydrogen sulfide.

The ion-exchange resin can be in the form of a solid.

The ion-exchange resin can be an amine-based ion-exchange resin.

The ion-exchange resin can be a weakly basic, polystyrene-based ion-exchange resin functionalized with primary amine groups comprising benzylamine.

The regeneration solution can include a base.

The base can be one or more of an alkali or alkaline earth metal carbonate, an alkali or alkaline earth metal hydroxide, an alkoxide, a metal oxide, ammonia, a metal amine, a carboxylate, a phosphine, an ether, a ketone, an alkene, and $CH_3$.

The regeneration solution commonly has a pH of at least about pH 10.

The acid gas can include $SO_2$.

The target gas component is $CO_2$. Most or all of the $CO_2$ in the gas stream can be removed by the ion-exchange resin.

$CO_2$ can be removed from the loaded ion-exchange resin by one or more of a pressure swing, temperature swing, and combination thereof.

The bonds between the between adjacent ion-exchange resin components and between the ion-exchange resin component and an adjacent ion-exchange resin substrate can be thermally stable during regeneration.

The bonds between the between adjacent ion-exchange resin components and between the ion-exchange resin component and an adjacent ion-exchange resin substrate can be stronger than bonds between the ion-exchange resin component and the target gas component and between the ion-exchange resin component and the acid gas and/or salt thereof.

The regeneration solution normally does not significantly impact the strengths of the bonds between the between adjacent ion-exchange resin components and between the ion-exchange resin component and an adjacent ion-exchange resin substrate.

After contact of the lean ion-exchange resin with the regeneration solution, the ion-exchange resin can be contacted with a wash solution to remove any deposit on the ion-exchange resin after contact with the regeneration solution.

The system can include a tangible and non-transient computer readable medium including microprocessor readable and executable instructions that, when executed, perform operations including to determine a concentration of a target gas component and/or an acid gas in a gas stream and/or purified gas stream and, when a determined relationship involving the determined concentration of the target gas component and/or acid gas in the gas stream and/or purified gas stream is deemed to exist, cause the following sub-operations to be performed;

(a) removing most or all of the target gas component from the loaded ion-exchange resin to form a lean ion-exchange resin, the lean ion-exchange resin still including most or all of the acid gas(es) and/or a salt thereof; and (b) optionally contacting the lean ion-exchange resin with a regeneration solution to remove most or all of the acid gas(es) and/or a salt thereof and form a fully treated ion-exchange resin for recycle.

The instructions, when executed, can select between first and second operating modes of the system based on whether the determined relationship is deemed to exist. In the first operating mode, the gas stream passes through a first gas component separator but not a second gas component separator, a first ion-exchange resin used by the first gas component separator is not regenerated, and a second ion-exchange resin used by the second gas component separator is undergoing regeneration. In the second operating mode, the gas stream passes through the second gas component separator but not the first gas component separator, the second ion-exchange resin used by the second gas component separator is not regenerated, and the first ion-exchange resin used by the first gas component separator is undergoing regeneration.

The present disclosure can provide a number of advantages depending on the particular configuration. It can provide a method by which an amine-based sorbent can be regenerated at preferred temperatures of at least about 100° C. or more preferably of at least about 120° C., without negatively affecting the sorbent structure or the utility of its functional sites. It can therefore provide a method to operate amine-based sorbents at elevated temperatures exceeding about 160° C. It can further decrease the energy penalty associated with $CO_2$ capture by operating in temperature ranges previously thought to be unfeasible with amine based sorbents. By offering a method to regenerate sorbents at higher temperatures, it can provide substantially lower operating costs for an amine-based sorbent $CO_2$ capture system. Adsorption and regeneration at higher temperatures can reduce the $CO_2$ working capacity, and the amount of sorbent to be circulated and heated can thus be reduced for the same amount of $CO_2$ capture, thereby decreasing costs for $CO_2$ capture. Using an adsorption temperature greater than about 30° C. can reduce significantly the capital and operating costs associated with $CO_2$ capture. At higher adsorption temperatures, the difference between the operating temperature and the cooling water is generally larger than at lower adsorption temperatures, which can reduce heat transfer surface area requirements. Generally, the overall cost for $CO_2$ capture can be reduced because the equipment required can be smaller while increasing, relative to conventional systems, the effective $CO_2$ working capacity. Although there may be a concern that higher adsorption and regeneration temperatures can, over time, lead to a reduction in the overall $CO_2$ capacity of the sorbent, any added sorbent replacement costs incurred would typically be offset by the overall reduction in the operating costs.

These and other advantages will be apparent from the disclosure of the aspects, embodiments, and configurations contained herein.

"A" or "an" entity refers to one or more of that entity. As such, the terms "a" (or "an"), "one or more" and "at least one" can be used interchangeably herein. It is also to be noted that the terms "comprising", "including", and "having" can be used interchangeably.

"Absorption" is the incorporation of a substance in one state into another of a different state (e.g. liquids being absorbed by a solid or gases being absorbed by a liquid). Absorption is a physical or chemical phenomenon or a process in which atoms, molecules, or ions enter some bulk phase—gas, liquid or solid material. This is a different process from adsorption, since molecules undergoing absorption are taken up by the volume, not by the surface (as in the case for adsorption).

"Adsorption" is the adhesion of atoms, ions, biomolecules, or molecules of gas, liquid, or dissolved solids to a surface. This process creates a film of the adsorbate (the molecules or atoms being accumulated) on the surface of the adsorbent. It differs from absorption, in which a fluid permeates or is dissolved by a liquid or solid. Similar to surface tension, adsorption is generally a consequence of surface energy. The exact nature of the bonding depends on the details of the species involved, but the adsorption process is generally classified as physisorption (characteristic of weak van der Waals forces)) or chemisorption (characteristic of covalent bonding). It may also occur due to electrostatic attraction.

An "acid" is a chemical substance having the ability to react with bases and certain metals (like calcium) to form salts. There are three common definitions for acids: the Arrhenius definition, the Brønsted-Lowry definition, and the Lewis definition. The Arrhenius definition defines acids as substances which increase the concentration of hydrogen ions (H$^+$), or more accurately, hydronium ions (H$_3$O$^+$), when dissolved in water. The Brønsted-Lowry definition is an expansion: an acid is a substance which can act as a proton donor. By this definition, any compound which can easily be deprotonated can be considered an acid. Examples include alcohols and amines which contain O—H or N—H fragments. A Lewis acid is a substance that can accept a pair of electrons to form a covalent bond. Examples of Lewis acids include all metal cations, and electron-deficient molecules such as boron trifluoride and aluminium trichloride.

"Acid gas" refers to any type of gas or gaseous mixture which forms an acidic compound when mixed with water. The most common types of acid gases are hydrogen sulfide (H$_2$S), sulfur oxides (SO$_X$) (which can form sulfuric acid when mixed with water), nitric oxides (NO$_X$) (which can form nitric acid when mixed with water), and carbon monoxide (CO) and/or carbon dioxide (CO$_2$) (which can form carbonic acid when mixed with water).

An "alkene", "olefin", or "olefine" is an unsaturated chemical compound containing at least one carbon-carbon double bond.

"Amines" are organic compounds and functional groups that contain a basic nitrogen atom with a lone pair. Amines are derivatives of ammonia, wherein one or more hydrogen atoms have been replaced by a substituent such as an alkyl or aryl group. Important amines include amino acids, biogenic amines, trimethylamine, and aniline. Inorganic derivatives of ammonia are also called amines, such as chloramine (NClH$_2$). Compounds with the nitrogen atom attached to a carbonyl of the structure R—CO—NR'R" are called amides and have different chemical properties from amines.

"Ash" refers to the residue remaining after complete combustion of the coal particles. Ash typically includes mineral matter (silica, alumina, iron oxide, etc.).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X$_1$-X$_n$, Y$_1$-Y$_m$, and Z$_1$-Z$_o$, the phrase is intended to refer to a single element selected from X, Y, and Z, a combination of elements selected from the same class (e.g., X$_1$ and X$_2$) as well as a combination of elements selected from two or more classes (e.g., Y$_1$ and Z$_o$).

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

A "base" is a substance that reacts with acids to form salts and can promote certain chemical reactions (base catalysis). For a substance to be classified as an Arrhenius base, it must produce hydroxide ions in solution. Examples of Arrhenius bases are the hydroxides of the alkali and alkaline earth metals (NaOH, Ca(OH)$_2$, etc.). In the Brønsted-Lowry acid-base theory, a base is a substance that can accept hydrogen ions (H$^+$)—otherwise known as protons. In the Lewis model, a base is an electron pair donor. Bases can be thought of as the chemical opposite of acids. Bases and acids are seen as opposites because the effect of an acid is to increase the hydronium (H$_3$O$^+$) concentration in water, whereas bases reduce this concentration. A reaction between an acid and base is called neutralization. In a neutralization reaction, an aqueous solution of a base reacts with an aqueous solution of an acid to produce a solution of water and salt in which the salt separates into its component ions.

"Biomass" refers to biological matter from living or recently living organisms. Examples of biomass include, without limitation, wood, waste, (hydrogen) gas, seaweed, algae, and alcohol fuels. Biomass can be plant matter grown to generate electricity or heat. Biomass also includes, without limitation, plant or animal matter used for production of fibers or chemicals. Biomass further includes, without limitation, biodegradable wastes that can be burnt as fuel but generally excludes organic materials, such as fossil fuels, which have been transformed by geologic processes into substances such as coal or petroleum. Industrial biomass can be grown from numerous types of plants, including miscanthus, switchgrass, hemp, corn, poplar, willow, sorghum, sugarcane, and a variety of tree species, ranging from eucalyptus to oil palm (or palm oil).

"Carbonaceous" refers to a carbon-containing material, particularly a material that is substantially rich in carbon.

A "carbonate" is a carbonate is a salt of carbonic acid, characterized by the presence of the carbonate ion, CO$^{2-}_3$, or an ester of carbonic acid, an organic compound containing the carbonate group C(=O)(O—)$_2$.

"Coal" refers to a combustible material formed from prehistoric plant life. Coal includes, without limitation, peat, lignite, sub-bituminous coal, bituminous coal, steam coal, anthracite, and graphite. Chemically, coal is a macromolecular network comprised of groups of polynuclear aromatic rings, to which are attached subordinate rings connected by oxygen, sulfur, and aliphatic bridges.

A "composition" refers to one or more chemical units composed of one or more atoms, such as a molecule, polyatomic ion, chemical compound, coordination complex, coordination compound, and the like. As will be appreciated, a composition can be held together by various types of bonds and/or forces, such as covalent bonds, metallic bonds, coordination bonds, ionic bonds, hydrogen bonds, electrostatic forces (e.g., van der Waal's forces and London's forces), and the like.

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

An "ether" is a class of organic compounds that contain an ether group—an oxygen atom connected to two alkyl or aryl groups—of general formula R—O—R'.

The terms "determine", "calculate" and "compute," and variations thereof, as used herein, are used interchangeably and include any type of methodology, process, mathematical operation or technique.

"Flue-gas desulfurization" or "FGD" refers to a set of technologies to remove gas-phase sulfur dioxide ($SO_2$), particularly from exhaust flue gases of fossil-fuel power plants and from the emissions of other sulfur oxide emitting processes.

"High alkali coals" refer to coals having a total alkali (e.g., calcium) content of at least about 20 wt. % (dry basis of the ash), typically expressed as CaO, while "low alkali coals" refer to coals having a total alkali content of less than 20 wt. % and more typically less than about 15 wt. % alkali (dry basis of the ash), typically expressed as CaO.

"High iron coals" refer to coals having a total iron content of at least about 10 wt. % (dry basis of the ash), typically expressed as $Fe_2O_3$, while "low iron coals" refer to coals having a total iron content of less than about 10 wt. % (dry basis of the ash), typically expressed as $Fe_2O_3$. As will be appreciated, iron and sulfur are typically present in coal in the form of ferrous or ferric carbonates and/or sulfides, such as iron pyrite.

"High sulfur coals" refer to coals having a total sulfur content of at least about 1.5 wt. % (dry basis of the coal) while "medium sulfur coals" refer to coals having between about 1.5 and 3 wt. % (dry basis of the coal) and "low sulfur coals" refer to coals typically having a total sulfur content of less than about 1.5 wt. % (dry basis of the coal), more typically having a total sulfur content of less than about 1.0 wt. %, and even more typically having a total sulfur content of less than about 0.8 wt. % of the coal (dry basis of the coal).

An "ion-exchange resin" is or "ion-exchange polymer" is a matrix (e.g., support structure), normally in the form of small (0.5-1 mm diameter) beads, fabricated from an organic polymer substrate. The beads are typically porous, providing a relatively high surface area. The trapping of ions occurs with concomitant releasing of other ions; thus, the process is called ion-exchange. There are four main types of ion-exchange resin differing in their functional groups: strongly acidic (typically, sulfonic acid groups, e.g. sodium polystyrene sulfonate or polyAMPS), strongly basic, (quaternary amino groups, for example, trimethylammonium groups, e.g. polyAPTAC), weakly acidic (mostly, carboxylic acid groups), and weakly basic (primary, secondary, and/or ternary amino groups, e.g. polyethylene amine). There are also specialised types of ion-exchange resins, such as chelating resins (iminodiacetic acid, thiourea, and many others). Commonly, ion-exchange resins are made of polystyrene sulfonate. Many ion-exchange resins are based on crosslinked polystyrene. The actual ion exchanging sites are commonly introduced after polymerization. Additionally, in the case of polystyrene, crosslinking can be introduced via copolymerization of styrene and, typically, a few percent of divinylbenzene. Amine functionalization can be done with primary amine groups, including benzylamine. Exemplary ion-exchange production processes include phthalimide processes.

A "ketone" is an organic compound with the structure $RC(=O)R'$, where R and R' can be a variety of carbon-containing substituents. Ketones feature a carbonyl group ($C=O$) bonded to two other carbon atoms.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

"Particulate" refers to fine particles, such as fly ash, unburned carbon, soot and fine process solids, typically entrained in a gas stream.

The phrase "ppmw X" refers to the parts-per-million, based on weight, of X alone. It does not include other substances bonded to X.

The phrase "ppmv X" refers to the parts-per-million, based on volume, of X alone. It does not include other substances bonded to X.

A "phosphine" is the compound with the chemical formula $PH_3$. Phosphines are also a group of organophosphorus compounds with the formula $R_3P$ (R=organic derivative).

A "pyridine" is a basic heterocyclic organic compound with the chemical formula $C_5H_5N$. It is structurally related to benzene, with one methine group (=CH—) replaced by a nitrogen atom. The pyridine ring occurs in many important compounds, including, without limitation, azines and the vitamins niacin and pyridoxal.

The terms "remove" or "removing" include the sorption, precipitation, adsorption, absorption, conversion, deactivation, decomposition, degradation, neutralization, and/or killing of a target material.

A "scrubber" or "scrubber system" is an air pollution control device that can be used to remove some particulates and/or gases from industrial exhaust streams. Traditionally, the term "scrubber" has referred to a pollution control device to "wash out" acid gases in an exhaust stream, such as a flue gas.

"Separating" and cognates thereof refer to setting apart, keeping apart, sorting, removing from a mixture or combination, or isolating. In the context of gas mixtures, separating can be done by many techniques, including electrostatic precipitators, baghouses, scrubbers, and heat exchange surfaces.

A "sorbent" is a material that sorbs another substance; that is, the material has the capacity or tendency to take it up by sorption.

"Sorb" and cognates thereof mean to take up a liquid or a gas by sorption.

"Sorption" and cognates thereof refer to adsorption and absorption, while desorption is the reverse of adsorption.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 8 is a plot of $CO_2$ loading (grams $CO_2$/100 grams fresh sorbent) (vertical axis) versus $CO_2$ partial pressure (bar) (horizontal axis);

FIG. 9 is a plot of $CO_2$ delta loading (grams $CO_2$/100 grams fresh sorbent) (vertical axis) versus cycle number (horizontal axis); and FIG. 10 is a plot of $CO_2$ loading (100×lb $CO_2$/lb sorbent) (vertical axis) versus cycle number (horizontal axis).

DETAILED DESCRIPTION

Process Overview

Figure 1:
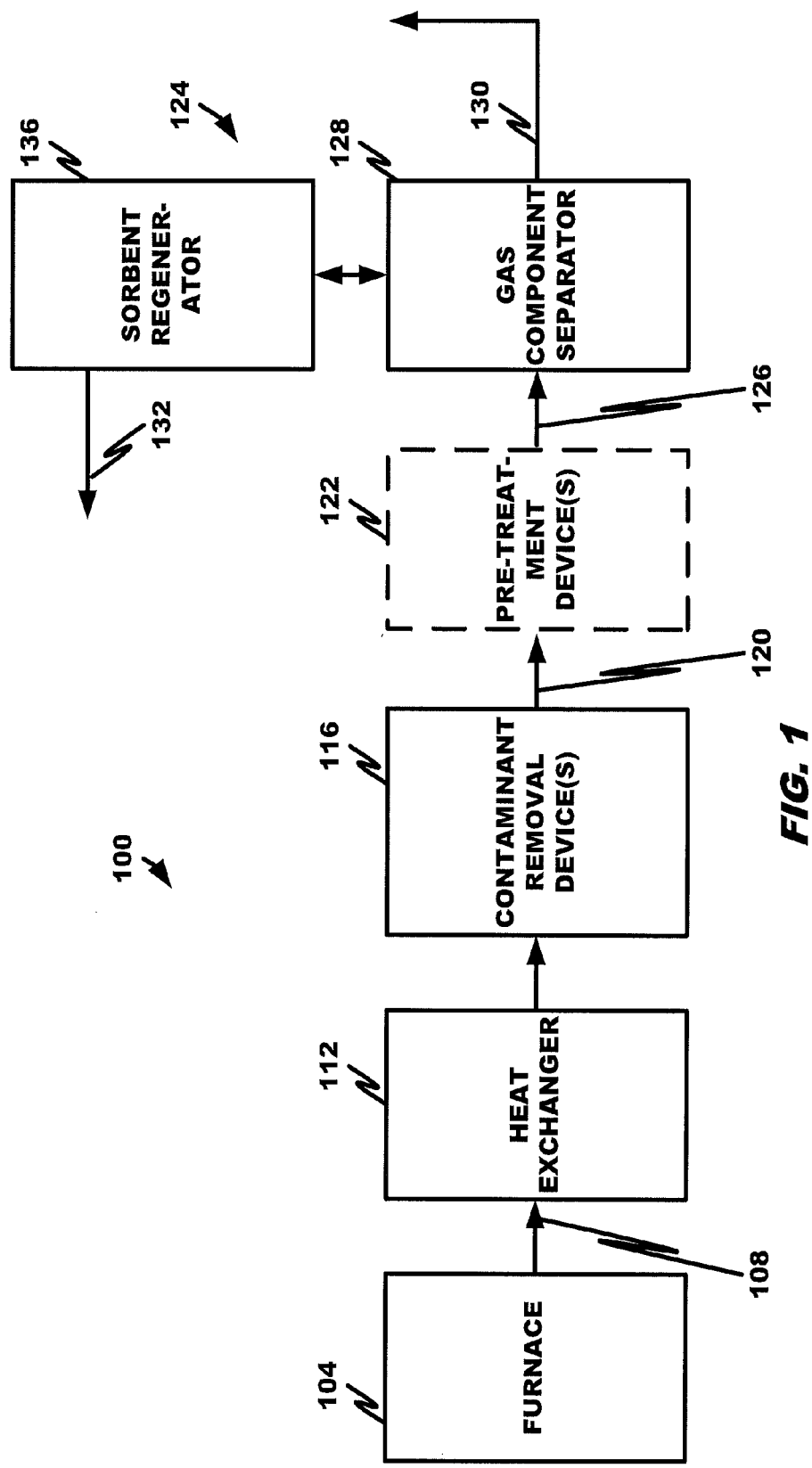
FIG. 1 is a block diagram of a typical waste gas stream treatment with an embodiment of the disclosure downstream of the contaminant removal devices.

The current disclosure is directed to using a sorbent, preferably an amine functionalized ion-exchange resin, at higher adsorption and regeneration temperatures than previously known in the art. The sorbent is contacted with a gas stream containing a target component. The sorbent sorbs at least a portion of the target contaminant from the gas stream. The target component-loaded sorbent is then heated to a temperature such that the sorbent will release at least most of the target component. The desorbing process is known as regenerating the sorbent. The disclosure is further directed to the use of an aqueous regeneration solution to remove heat stable acid gas and/or other acid and/or salt components from a sorbent used to remove a target component from an acid-containing gas stream. Even though elevated sorbent regeneration temperatures are employed, the sorbent can collect acid gas and/or other acid and/or salt components that remain collected on the thermally regenerated sorbent. The target component can be a contaminant, byproduct, product, or other substance targeted for removal. An exemplary target component is a carbon oxide, with carbon dioxide being more exemplary. The gas stream, for example, can be a contaminated waste gas generated by a gas evolving facility, such as a smelter, autoclave, roaster, steel foundry, steel mill, cement kiln, power plant, waste incinerator, boiler, and other contaminated gas stream-producing industrial facilities. Although the target contaminant is typically evolved by combustion, it may be evolved by other oxidation and/or reduction reactions, such as roasting, autoclaving, and other thermal processes that expose contaminant-containing materials to elevated temperatures.

While not wishing to be bound by any theory, it is believed that the acid gas can form a heat stable salt with the functional sites on the sorbent. For amine-based sorbents, it is believed that the heat stable salt is a complex between the amine and the acid molecule. Water vapor may be involved in complex formation. The regeneration solution, which can be an aqueous base solution, can treat the sorbent to reclaim functional or active sites saturated with the heat stable salts. It is believed that the base in the regeneration solution neutralizes the acid to form at least one weakly basic and/or weakly acidic salt(s), which have a much weaker bond to the active sites on the sorbent and may be removed effectively by a water wash.

In one application, the sorbent is an amine-based sorbent and the gas component targeted by the sorbent is a carbon oxide (e.g., carbon monoxide and/or dioxide) contaminant, and the acid gas that can cause fouling of the sorbent is a sulfur oxide (e.g., $SO_X$), nitrogen oxide (e.g., $NO_X$), and/or hydrogen sulfide (which forms hydrosulfuric or sulfhydric acid in water). Commonly, the amine-based sorbent is utilized in a post-combustion environment. Generally the amine-based sorbent is used as an active component of a flue gas sorbent system. Typical applications include post-combustion flue gas in a coal-fired power plant system, though any post-combustion or gas clean-up system with carbon oxide- and acid gas-containing mixtures can be treated in the application. Surprisingly and unexpectedly, it has been discovered that some amine-based ion-exchange resins can be heated to, or regenerated at, temperatures of approximately 100° C. or more. New research further establishes that some amine-based ion-exchange resins can be heated to regeneration temperatures of approximately 160° C. or more and still provide necessary functionality for $CO_2$ capture, even after repetitive sorbtion/regeneration cycles. Benefits of this application can include a reduction in energy penalty, resulting in lower operating costs of the $CO_2$ capture system, and smaller scale equipment, resulting in a reduced capital cost for the $CO_2$ capture system.

In one application, the sorbent is an amine-based or other hydrocarbon collecting sorbent and the gas component targeted by the sorbent for recovery or removal is a hydrocarbon. An exemplary gas treated by the sorbent is natural gas. Commonly, the sorbent is used to treat a gas produced by an underground formation or industrial facility. Generally, the sorbent is used as an active component in a produced gas purification system.

The sorbent can have other compositions depending on the targeted gas component. Examples include not only the sorbent compositions identified above but also activated carbon, zeolite, clay (or phyllosilicate material) (such as a kaolinite, montmorillonite-smectite, illite, and chlorite), fly ash, and/or metal-containing sorbents, particularly metal-organic sorbents. Typically, the metal(s) in the latter sorbent compositions are one or more metals from IUPAC Groups 3 through 12, more typically from IUPAC Groups 8 through 12, and even more typically from IUPAC Group 11 of the Periodic Table of Elements.

The Gas Treatment Process

FIG. 1 depicts an exemplary plant 100 for a coal-fired power plant, natural gas combined cycle power plant, co-production facility, biomass-fired power plant, waste incinerator, and the like. While the process is discussed with reference to removing carbon oxides from a contaminated gas stream, it is to be understood that the process may be used to regenerate sorbent collecting different target gas components in the same or other processes.

Turning to FIG. 1, a feed material, such as coal (e.g., high alkali coal, high iron coal, and/or high sulfur coal), is combusted in a furnace 104, which produces a gas stream 108. The gas stream 108 typically contains many impurities and/or contaminants, including acid gas(es), particulates, elemental and speciated mercury, uncombusted hydrocarbons (such as coal, ash, methane, propane, ethane, and the like), carbon oxides (CO and $CO_2$), water vapor, and the like. Any of these can be the target gas component.

A gas stream comprises typically at least about 1 vol % $CO_2$ and more typically at least about 5 vol % $CO_2$ and typically no more than about 15 vol % $CO_2$ and more typically no more than about 20 vol % $CO_2$. In certain applications however, a gas stream may comprise up to 60% $CO_2$, or up to 95% or more $CO_2$.

The gas stream 108 is passed through a heat exchanger 112 to transfer thermal energy to an oxygen-containing gas to be introduced into the furnace 104 and then through one or more contaminant removal device(s) 116 to remove selected contaminants, such as acid gas(es), particulates, and/or mercury. Common devices for removal of acid gas(es) include dry and wet scrubbers and FGD systems; for removal of particulates include electrostatic precipitators and baghouses; and for removal of mercury include additives, particularly powdered activated carbon and halogens.

The treated gas stream 120 is optionally passed through optional flue gas pre-treatment device(s) 122 to form a pre-treated gas stream 126. The optional gas pre-treatment device(s) 122 will be specific to the particular gas being treated. For example, it may be necessary to reduce further concentrations of other constituents, such as $SO_2$. In addition, it may be desirable to cool and/or increase the pressure of the gas. In some cases, cooling the gas or increasing the pressure could result in the condensation of water out of the gas phase. Additional moisture could be removed if desired, but it may not be necessary. The gas pressure must be, at a minimum, sufficient to overcome any pressure drop due to the $CO_2$ capture process.

Figure 2:
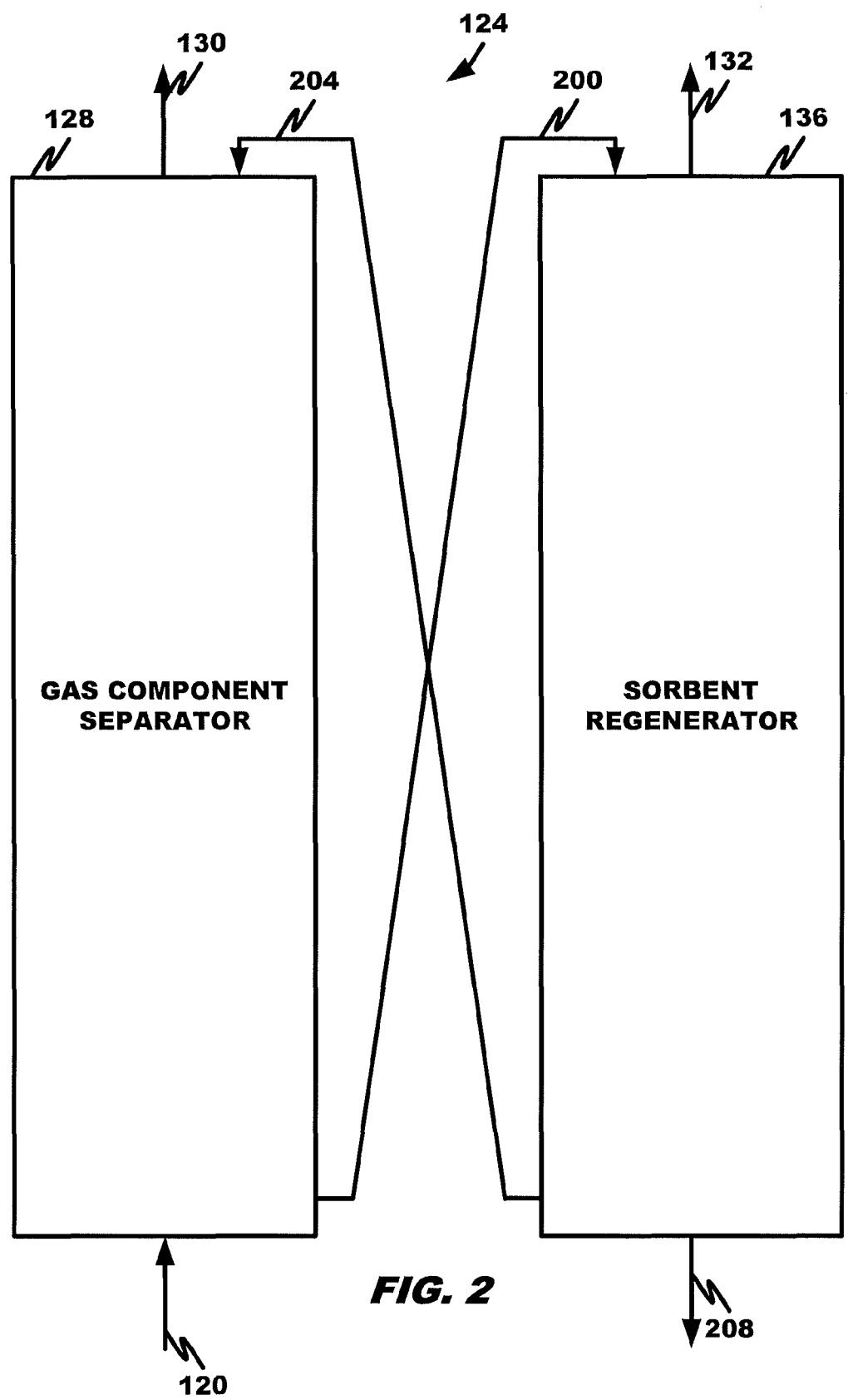
FIG. 2 is a block diagram of a separation system according to the disclosure.

With reference to FIGS. 1 and 2, the treated gas stream 120 (or pre-treated gas stream 126) is next introduced into a gas component separator 128 of the separation system 124 to remove commonly most, more commonly about 50% or more, and even more commonly about 85% or more of the $CO_2$ from the treated gas stream 120 (or pre-treated gas stream 126) and form a purified gas stream 130, a $CO_2$-rich product gas 132, and a $CO_2$ loaded sorbent 200. The $CO_2$ loaded sorbent 200 is introduced into a sorbent regenerator 136 for evolution of the sorbed gas constituent (i.e., $CO_2$) from the sorbent to form a $CO_2$ lean sorbent 204 for recycle to the gas component separator 128 and the $CO_2$-rich product gas 132.

FIG. 2 depicts a counter-current system where the treated gas stream 120 enters one side of the gas component separator 138 while the $CO_2$ lean sorbent 204 enters the opposite side. Typically and as shown in FIG. 2, the treated gas stream 120 and sorbent flow counter-currently; that is, the treated gas stream 120 flows upwards, while the lean sorbent 204 travels downwards. It is to be appreciated, however, that the other configurations are possible in which the treated gas stream 120 and sorbent flow co-currently.

The $CO_2$ can be evolved by any suitable mechanism, including pressure and/or temperature swing. In the former mechanism, a pressure differential exists between the operating pressures in the gas component separator 128 and the sorbent regenerator 136, which causes the $CO_2$ to enter the gas phase. In the case where pressure swing is utilized, the operating pressure in the gas component separator 128 is usually greater than the operating pressure in the sorbent regenerator 136. Relative to ambient pressure, the operating pressures can be positive or negative (e.g., under vacuum). In the latter mechanism, a temperature differential exists between the operating temperatures in the gas component separator 128 and the sorbent regenerator 136, which causes the $CO_2$ to enter the gas phase. Generally, the operating temperature in the gas component separator 128 is less than the operating temperature in the sorbent regenerator 136.

In one configuration, the sorbent regenerator 136 utilizes a change in temperature optionally with a change in total pressure and/or partial pressure to regenerate the sorbent and release the $CO_2$. The temperature can be increased through direct, indirect, or a combination of direct and indirect heating. The heat input should be sufficient to address both the sensible heat required to change the temperature of the sorbent as well as overcome the enthalpy of reaction required to release the $CO_2$ and any other sorbed constituents, which may be endothermic. In one application, a sweep gas, either steam or a mixture of steam and $CO_2$, is injected into the sorbent regenerator 136. In one design, the gas component separator 128 and sorbent regenerator 136 each include plural staged fluidized beds. The $CO_2$ lean sorbent 204 can be extracted from the last stage (where $CO_2$ loading is lower than other stages). In another design, the gas component separator 128 and regenerator 136 each use a single fluidized bed.

The purified gas stream 130 commonly contains no more than about 1000 ppm, more commonly no more than about 2 vol %, and even more commonly no more than about 10 vol % $CO_2$. Because most of the other contaminants referenced above have been removed from the gas stream 108 by the contaminant removal device(s) 116 and optional pretreatment device(s) 122, the purified gas stream 130 can be discharged into the atmosphere via a stack (not shown).

A $CO_2$-rich product gas 132 commonly contains most, more commonly about 75% or more, and even more commonly about 90% or more of the $CO_2$ removed from the treated gas stream 120. The $CO_2$-rich product gas 132 commonly has a relatively high purity of $CO_2$ with a relatively low impurity content. The $CO_2$-rich product gas 132 typically contains from about 1 vol % to about 99 vol %, more typically from about 25 vol % to about 95 vol %, and even more typically from about 50 vol % to about 90 vol. % $CO_2$ and from about 1000 ppm to about 90 vol %, more typically from about 1 vol % to about 50 vol %, and even more typically from about 5 vol % to about 15 vol. % water vapor. The balance of the $CO_2$-rich product gas 132 is comprised of impurities including molecular oxygen, nitrogen, and carbon monoxide.

In one application, an amine-based sorbent is used in the gas component separator 128 and therefore as an active component of a waste gas treatment system. Typical applications include post combustion flue gas in a coal fired power plant system, though any post-combustion or any gas clean up system with carbon dioxide and acid gas containing mixtures would be appropriate for the application. When placed into use, the amine-based sorbent system adsorbs flue gas contaminants, such as carbon dioxide ($CO_2$), sulfur dioxide ($SO_2$) and other acid gases. Preferably the amine-based sorbent system targets $CO_2$ collection. This is because other, often more inexpensive, systems exist for targeting other acid gases. Although it targets $CO_2$ collection, the amine-based sorbent can collect the other acid gases remaining in the flue gas stream.

The acid gases, in particular sulfur-based gases, can react with the amine-based sorbent to form heat stable salts. The formation of heat stable salts necessarily reduces capacity of the sorbent to collect $CO_2$. The acid gas, such as $SO_2$, binds to the amine functional group of the sorbent, and blocks reactive sites for $CO_2$ adsorption. Typically, when $CO_2$ collection capacity has reduced to an unacceptable level, the sorbent must be regenerated. Removing the heat stable salts from the amine-based sorbent enables reuse and recycle of the sorbent to capture further $CO_2$.

As discussed in copending U.S. application Ser. No. 14/032,030, filed Sep. 19, 2013, at least a portion of the sorbent 208 is therefore optionally removed from the sorbent regenerator for removal of heat stable acid gas and/or other acid and/or salt components from the sorbent prior to recycle to the treated gas stream contacting operation. The further treated or fully regenerated sorbent can then be recycled as all or part of the lean sorbent 204 to the gas component separator 128.

While increased regeneration temperatures can be beneficial, so too can be increased adsorption temperatures. Earlier literature disclosed that amine-based ion-exchange resins can adsorb $CO_2$ at temperatures of about 20° C. to 30° C. Using an adsorption temperature greater than about 30° C. can significantly reduce the capital and operating costs associated with $CO_2$ capture. At higher adsorption temperatures, equipment can be scaled downward in size and result in significantly lower capital costs for the $CO_2$ capture system. This result is due to the larger difference between the operating temperature and the cooling water temperature, which can reduce heat transfer surface area requirements.

The solid sorbent used in the gas component separator 128 is formulated to survive repeated thermal swing cycles and/or contact with the regeneration solution. "Survival" means that the solid sorbent not only substantially retains its ability to sorb the targeted gas component but also resists substantially loss of its solid mass. This generally requires the sorbent to have a stronger bond between sorbent components (e.g., substrate and amine functional groups) and/or between the sorbent component and any sorbent substrate than to the targeted gas component or heat stable acid and/or salt to be removed from the sorbent surface and/or active or functional sites.

For example, an amine-based sorbent will desirably have internal amine bonds to a sorbent substrate that are relatively stable in the presence of elevated sorption and regeneration temperatures and, when removal of heat stable acid gas and/or other acid and/or salt components is performed, relatively stronger than the acid gas or salt—to—amine bonds (e.g., the $SO_2$—to—amine bonds. When an amine-based ion-exchange resin is selected as the sorbent, it should be of sufficient thermal stability to withstand regeneration temperatures of up to about 180° C. and, in some applications, up to about 160° C. Other sorbents may be selected for use alone or with the amine-based ion-exchange resin, with the criteria that their bond structure allows for heating the sorbent to regeneration temperatures of greater than about 100° C., more preferably greater than about 120° C., even more preferably greater than about 140° C. $SO_2$ can form relatively strong bonds with functional sites on an amine-based sorbent. The $SO_2$—to—amine bond can be stronger than the bonds between the amine and the sorbent substrate. This presents a challenge when attempting to desorb the $SO_2$ species, as the process can result in degradation or decomposition of the structure of the amine-based sorbent. This can be particularly problematical in thermal desorption of $SO_2$ from the amine-based sorbent in a temperature swing process. Often, the $SO_2$—to—amine bond is so strong that temperatures in excess of 180° C. are required to desorb the $SO_2$. When $SO_2$ collection by the sorbent is a problem, removal of the acid gas as set forth in copending U.S. application Ser. No. 14/032,030, filed Sep. 19, 2013, can be performed.

Preferred sorbents are amine-based ion-exchange resins and more preferred sorbents are amine-functionalized ion-exchange resins. For $CO_2$ as the target component, the ion-exchange resin is preferably a weakly basic ion-exchange resin. The ion-exchange resin can be a polystyrene polymer-based resin, which is cross-linked via the use of divinylbenzene and is functionalized with primary amine groups, including benzylamine. The ion-exchange resin can be in the form of bead polymers formed of polystyrene polymer resins comprising primary amines and cross-linked via divinylaromatics such as, for example, aminomethylated polystyrene-co-divinylbenzene (i.e., polybenzyl amine-co-divinylbenzene). The ion-exchange resins can be monodisperse or heterodisperse and macroporous or gel-types (microporous). Monodisperse substances normally have a uniformity coefficient of the distribution curve of less than or equal to 1.2. The uniformity coefficient is the quotient of the sizes $d_{60}$ and $d_{10}$. $d_{60}$ describes the diameter at which 60% by mass of those in the distribution curve are smaller and 40% by mass are greater or equal. $d_{10}$ designates the diameter at which 10% by mass in the distribution curve are smaller and 90% by mass are greater or equal.

Monodisperse bead polymers, the precursor of the corresponding monodisperse ion-exchange resin, can be produced, for example, by bringing to reaction monodisperse, if desired, encapsulated, monomer droplets consisting of a monovinylaromatic compound, a polyvinylaromatic compound, and an initiator or initiator mixture, and if appropriate a porogen in aqueous suspension. To obtain macroporous bead polymers for producing macroporous ion-exchangers, the presence of porogen is utilized. The various production processes of monodisperse bead polymers both by the jetting principle and by the seed-feed principle are known to those skilled in the art. Reference is made to U.S. Pat. No. 4,444,961, EP-A 0 046 535, U.S. Pat. No. 4,419,245 and PCT WO 93/12167, each of which is fully incorporated herein by reference.

Monovinylaromatic unsaturated compounds comprise compounds such as styrene, vinyltoluene, ethylstyrene, alpha-methylstyrene, chlorostyrene or chloromethylstyrene. Polyvinylaromatic compounds (crosslinkers) used include divinyl-bearing aliphatic or aromatic compounds. For example, use is made of divinylbenzene, divinyltoluene, trivinylbenzene, ethylene glycol dimethacrylate, trimethylol propane trimethacrylate, hexa-1,5-diene, octa-1,7-diene, 2,5-dimethyl-1,5-hexadiene and also divinyl ether.

In addition to the use of aromatic monomers as the starting material for the polymeric ion-exchange resin (for example, vinyl and vinylidene derivatives of benzene and of naphthalene (vinylnaphthalene, vinyltoluene, ethylstyrene, alpha-methyl-styrene, chlorostyrenes, and styrene), various non-aromatic vinyl and vinylidene compounds may also be employed. For example, acrylic acid, methacrylic acid, $C_1$-$C_8$ alkyl acrylates, $C_8$ alkyl methacrylates, acrylonitrile, methacrylonitrile, acrylamide, methacrylamide, vinyl chloride, vinylidene chloride, and vinyl acetate.

The subsequent functionalization of the bead polymer ion-exchange resin can provide a functionalized ion-exchange resin that is also generally known to those skilled in the art. For example, US 2006/0173083, which is hereby incorporated by reference, describes a process for producing monodisperse, macroporous ion-exchangers having weakly basic primary amine groups by what is termed the phthalimide process. The phthalimide process generally includes: a) reacting monomer droplets of at least one monovinylaromatic compound and at least one polyvinylaromatic compound and also a porogen and an initiator or an initiator combination to give a monodisperse crosslinked bead polymer, b) amidomethylating this monodisperse crosslinked bead polymer with phthalimide derivatives, and c) reacting the amidomethylated bead polymer to give a basic ion-exchanger having aminomethyl groups in the form of primary amine groups.

A primary amine ion-exchanger can be produced by the above phthalimide addition process or by the chloromethylation process. As is generally known, the chloromethylation process is one in which a chloromethylate is formed that is subsequently reacted with amines to form an aminomethylated polymer. The phthalimide addition process can be utilized to produce the ion-exchange resin. As a result of the phthalimide addition process for the production of the ion-exchange resin, secondary cross-linking is generally limited as compared to the chloromethylation process. Such secondary cross-linking may occur during the chloromethylation process in which the primary amines of the aminomethylated polymer react to form secondary amines (secondary cross-linking). Such secondary crosslinking is typically less than about 30% of the formed polymer, more typically less than about 10%, and even more typically, less than about 5%.

The particle size of the bead polymer formed in the production processes, including those provided above, for example, may be set during polymerization, as well as the bead polymers sphericity. Bead polymers having a mean particle size of approximately from 10 to 1000 µm can be used. Bead polymers having a mean particle size of approximately from 100 to 1000 µm can be employed. Bead polymers having a mean particle size of approximately from 100 to 700 µm can be used. The bead polymer may take the form of spherical polymer beads or non-spherical beads (or blocks).

As will be appreciated, other amine-based ion-exchange resins can be used.

Figure 7:
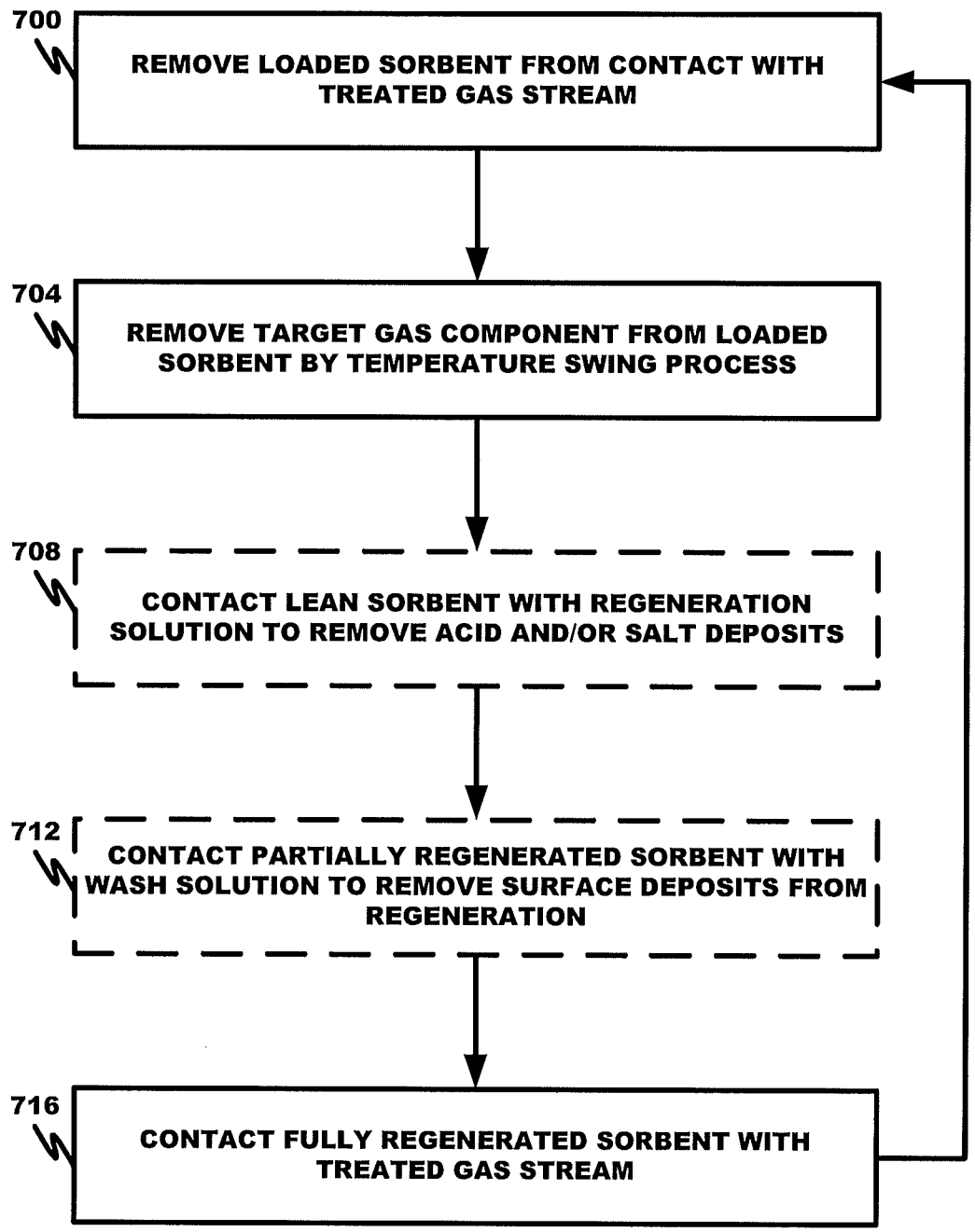
FIG. 7 is a flow chart of a regeneration process according to an embodiment of the disclosure.

Heat Stable Acid and Salt Species Removal from the Target Gas Component Lean Sorbent With reference to FIG. 7, the sorbent 200 is removed from contact with the treated gas stream 120 (typically performed at the temperatures discussed above) (step 700), the target gas component is removed from the loaded sorbent by the temperature swing process discussed above (step 704), before, during, or after target gas component removal from the sorbent 200, the target gas component lean sorbent is optionally contacted with the regeneration solution to remove acid and/or salt deposits on the sorbent (step 708), the partially regenerated sorbent is optionally contacted with the wash solution to remove surface deposits from step 708 (step 712), and the fully regenerated sorbent is again contacted with the treated gas stream 120 (step 716). When used, the regeneration solution includes one or more bases to cause desorption and/or degradation of the heat stable acid and/or salt from the sorbent, and the wash solution is typically an aqueous solution to remove the base and/or derivative thereof (e.g., from reaction of the acid and/or salt with the base) from the active or functional sites of the sorbent.

The composition of the regeneration solution and operating temperature of the temperature swing process depends on the particular characteristics of the selected solid sorbent. The temperatures and regeneration solution are selected to have substantially no adverse impact on the stability and/or strength of chemical and other bonds within the sorbent matrix. For unsupported and supported sorbents, the bonds between adjacent molecules of the sorbent material and between the sorbent material molecules and any substrate are substantially unaffected by thermal regeneration and contact with the regeneration solution.

Although any base may be employed, the effectiveness of the base depends on the sorbent composition. Particularly strong bases, such as superbases (such as Group 1 salts of carbanions, amides, and hydrides), can adversely impact one or both types of bonds within the sorbent matrix. Weak bases may be unable to cause acid and/or salt removal from the sorbent surface. Commonly, bases of intermediate strength are used. Exemplary bases include alkali and alkaline earth metal hydroxides, carbonates, and alkoxides, metal oxides, ammonia, metal amines, and carboxylates. Conjugate bases to the acid can be employed (e.g., halides, hydrogen sulfate ion, nitrate ions, water, sulfate ion, dihydrogen phosphate ion, acetate ion, hydrogen carbonate ion, hydrogen sulfide ion, hydrogen phosphate ion, ammonia, carbonate ion, phosphate ion, and hydroxide ion).

Because some amine-based sorbent formulations can be degraded over time due to adverse chemical reactions with the regeneration solution, preferred amine-based sorbents are formulated to withstand repeated acid gas and heat stable salt desorbing cycles, have sufficient thermal stability to withstand repeated thermal swing desorption cycles, and have sufficient structural stability to withstand repeated washing with the regeneration solution without suffering significant structural decomposition or reduction in target gas component capacity. Stated differently, the preferred amine-based sorbents have thermally and chemically stable bonds within the sorbent matrix that are stronger than the $SO_2$—to—amine bond.

Amine-based sorbents act as Lewis Bases to bind with $CO_2$, $SO_2$ and other molecules that are Lewis Acids. As such, stronger Lewis Bases may be used to out compete the amine-based sorbent for the $SO_2$ molecule and thus regenerate the sorbent using a variety of solvents or aqueous phase ions including but not limited to $OH^-$, $CH_3^-$, etc. Additional Lewis Bases include pyridines and its family of compounds, phosphines, water, ethers, ketones, and other compounds containing an available electron pair including organic compounds such as alkenes (ethylene, ethene, benzene, etc.)

In one application, a target gas component lean amine-based sorbent containing heat stable salts is exposed to aqueous hydrated lime. The aqueous hydrated lime reacts with the heat stable salts to form calcium sulfite ($CaSO_3$). The calcium sulfite can be oxidized to form gypsum. The resulting gypsum can be discarded into the outgoing gypsum pile at the power plant. After heat stable salts are removed from the amine-based sorbent, the amine-based sorbent can be reinserted into the waste sorbent system, and the resulting waste added into a revenue generating stream for the power plant.

The regeneration solution is an aqueous basic solution typically having a pH above pH 7, more typically at least about pH 8, more typically at least about pH 9, and even more typically at least about pH 12.

As will be appreciated, a wide range of basic aqueous solutions can be used as the regeneration solution. The above examples are representative only and are not intended to limit the scope of potential applications.

When properly formulated, the sorbent can operate in the preferred temperature region(s) necessary to promote heat stable salt desorption while withstanding decomposition of the sorbent.

The regeneration solution can reclaim active or functional sites saturated with heat stable acid and salt species. Typically, the regeneration solution removes at least about 50, more commonly at least about 70, and even more commonly at least about 80 mole % of the acid and salt species sorbed at the functional sites of the sorbent.

Following contact with the regeneration solution, the acid and/or salt at the active or functional sites of the target gas component lean sorbent are replaced by the base or a derivative thereof. To remove the base or base derivative from the active or functional sites, the regenerated sorbent is washed with a water wash solution. Typically, the wash solution removes at least about 70, more commonly at least about 80, and even more commonly at least about 90 mole % of the base and base derivative from the functional sites of the sorbent. The pH of the wash solution typically ranges from about pH 6 to about pH 8 and more typically from about pH 6.5 to about pH 7.5.

Commonly, regeneration and rinsing of the sorbent are executed at temperatures between about 0 and 100° C., and more preferably at temperatures between about 20 and 40° C.

By way of illustration and after removal of the target gas component from the amine-based sorbent, the target gas component lean amine-based sorbent containing heat stable acid and/or salts (typically from reaction with a nitrogen oxide or sulfur oxide in a flue gas stream) is first contacted with aqueous sodium carbonate ($Na_2CO_3$(aq)). The heat stable salts, such as the complex formed by $SO_2$ and the amine based sorbent are broken down or degraded by reaction with the $Na_2CO_3$. Typically at least about 50% and more typically at least about 75% of the heat stable acid and/or salts are destroyed by this process. The amine-based sorbent, no longer containing heat stable salts, is rinsed with the wash solution to ensure no $Na_2CO_3$ remains on the sorbent (or that the sorbent is substantially free of $Na_2CO_3$ or a derivative thereof).

The regeneration solution may itself be regenerated and combined with fresh solution. It may be passed through a fine particle separator, such as a cyclone, filter, membrane, fine solids settling tank, decantation or wash circuit, and the like, to remove precipitates followed by contact with fresh base to raise the pH to the desired levels.

The pH of the wash solution may rise over time due to removal of base from the sorbent. To maintain the pH of the wash solution in the desired range, it may be contacted with an acid, such as an acid removed from the waste gas.

In any regeneration system, it may be important to remove, from the regeneration and/or wash solutions selected dissolved contaminants to avoid excessive build-up during solution recycle. Examples of such dissolved contaminants include, for example, selenium, the base, base derivatives, mercury, arsenic, chromium, and mixtures thereof. This can be done by treating the entire regeneration or wash solutions or simply a bleed stream thereof. Any suitable technique can be used to remove at least a portion, and typically at least most, of the dissolved contaminant, including precipitation, ion-exchange, adsorption, absorption, electrolysis, membrane separation, neutralization, and the like.

Systems for Regenerating the Sorbent

Various systems can be used to contact the sorbent with the target gas component and regenerate and treat the loaded sorbent.

With reference to FIG. 2, sorbent 208 is removed (after removal of the sorbed target gas component in the sorbent regenerator 136 by the temperature swing process) and optionally regenerated and stripped of acid and/or salt deposits in a batch-type regeneration reactor vessel (not shown) where the regeneration process (in which the target gas component lean sorbent is contacted with the regeneration and wash solutions) is separated from the target gas component (e.g., $CO_2$) capture and removal processes. Some means of pneumatic, mechanical, or other conveying mechanism can transport the sorbent particles between the sorbent regenerator 136 and sorbent regeneration reaction vessel. In either configuration, the sorbent addition and extraction locations in the separator and/or regenerator are separated using one or more baffles.

Alternatively, the target gas component lean sorbent may be regenerated online in a continuous "polishing" process as the lean sorbent is passed from the sorbent regenerator 136, which facilitates removal of the sorbed target gas component (e.g., $CO_2$) from the sorbent, to the gas component separator 128, where the sorbent binds with target gas component in the treated gas stream 120 (or pre-treated gas stream 126).

Figure 3:
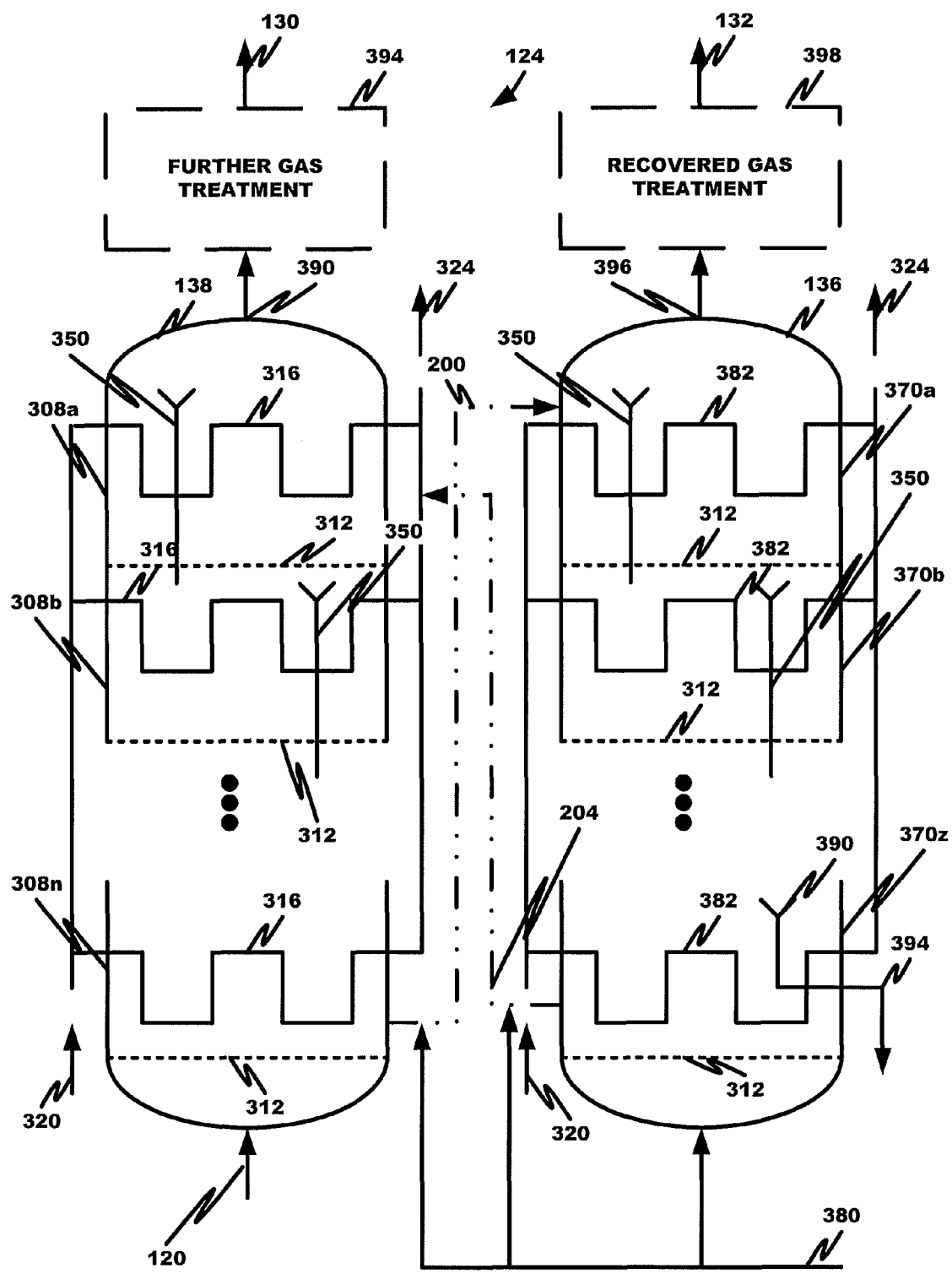
FIG. 3 is a block diagram of a separation system according to an embodiment of the disclosure.

A first example of this process will be discussed with reference to FIG. 3, which shows a staged fluidized bed reactor configuration. Staged fluidized beds can be used to approach counter current contacting (i.e., an infinite number of stages can result in counter current contacting).

The treated gas stream 120 enters a lower end of the fluidized bed separator 138 comprising first, second, . . . nth stages 308*a-n*. The fluidized sorbent beds are commonly staged in such a way that the targeted gas component (e.g., $CO_2$) removal may be distributed throughout the vessel. Each stage of the fluidized bed separator comprises a distributor 312 supporting a bed of sorbent particles and a cooling device 316. As the pre-treated gas stream 304 and sorbent particles are contacted, the targeted gas component in the pre-treated gas stream 304 will be sorbed on the sorbent, typically at the elevated temperatures discussed above. Since the adsorption reaction between the targeted gas component and sorbent is commonly exothermic, the cooling device 316 controls any temperature increase, and attempts to maintain a substantially constant temperature within the bed and across the height of the separator 138, by removing heat.

Although any suitable cooling mechanism may be employed, the cooling device 316 is generally an indirect heat exchanging device that moves a cooling fluid through the bed 400 to maintain a selected temperature substantially uniformly throughout the bed volume. The cooling device 316 depicted in FIG. 3 is an indirect heat exchanger where the sorbent moves between plates or around tubing that includes a cooling media. As shown in FIG. 3, a (cold-side) cooling fluid 320 is inputted into the various cooling devices 316. The cooling fluid extracts heat from the corresponding bed of sorbent particles and forms a (hot-side) cooling fluid 324. In one configuration the thermal energy collected by the hot cooling fluid 324 is substantially removed, and the cooled cooling fluid recycled as the (cold-side) cooling fluid 320.

The distributor 312 separates each of the distinct fluidized bed stages and is designed to support the overlying fluidized bed from the bottom and also redistribute the fluidizing gas as it migrates through the fluidized bed separator 138 vessel. The distributors can be designed to substantially minimize pressure loss as the fluidizing gas passes through the distributor while maintaining substantially a distinct fluid bed level in each stage and substantially optimized to distribute the gas effectively throughout the bed of sorbent.

While any suitable method may be used to transfer sorbent particles from one bed to another, a common mechanism for moving sorbent particles from an upper bed 400 to a lower bed 400 is through down corners 350, which can be either interior or exterior to the separator 138 vessel or both. As can be seen from FIG. 3, the adjacent down corners 350 are offset from one another and not aligned to prevent short circuiting of sorbent particles.

After the sorbent exits the separator 138, it is transferred to the sorbent regenerator 136 for thermal regeneration (or thermally induced desorption of the $CO_2$, which includes a plurality of stages 370*a-z*, each stage comprising, like the stages 308*a-n* of the separator 138, a distributor 312 but unlike the separator 138 heating device(s) 382 rather than cooling device(s) 316. The above description of these components applies equally to the sorbent regenerator 136. The heating device(s) 382 can be any suitable heating device, with an indirect heat exchanger being typical. In one configuration, the regenerator 136 is a single fluidized bed. In one configuration, the separator and regenerator vessels are stacked so that no sorbent conveying is necessary between the two vessels. In another configuration, some means of pneumatic, mechanical, or other conveying mechanism transports the sorbent particles between vessels. In either configuration, the sorbent addition and extraction locations in the separator and/or regenerator are separated using one or more baffles.

Although mechanical conveying of the sorbent can be utilized to transfer the sorbent from one reaction vessel to the next, to increase the reliability of the system it is preferable to minimize equipment with moving parts. Therefore, pneumatic conveying is generally used to move the sorbent from the separator 138 to the regenerator 136 and from the regenerator 136 to the separator 138. Referring to FIG. 3, the loaded sorbent particles from the lowermost stage 308*n* of the separator 138 are conveyed pneumatically to the uppermost stage 370*a* of the regenerator 136. A carrier gas 380, which may be a slip- or bleed stream of the treated and/or pre-treated gas streams 120 or 304 and/or target gas component-rich product gas 132. In one configuration, a slipstream of the product stream 132 is partly dried and pressurized before being used to convey the sorbent from the separator 138 to the regenerator 136 and from the regenerator 136 to the separator 138. In another configuration, flue gas, target gas component lean flue gas, steam, nitrogen, or air is to convey the sorbent from the regenerator 136 to the separator 138.

The regenerator 136 utilizes a change in temperature and optionally pressure or partial pressure to regenerate the sorbent and release the sorbed target gas component, thereby forming the target gas component lean sorbent. The temperature can be increased through direct, indirect, or a combination of direct and indirect heating. The heat input should be sufficient to address both the sensible heat required to change the temperature of the sorbent as well as overcome the enthalpy of reaction required to release the target gas component and any other sorbates, which may be endothermic. The operating temperature of the separator 138 is commonly in a range of from about 25° C. to about 500° C., more commonly is greater than 30° C., more commonly is greater than 35° C., more commonly is greater than 40° C., and even more commonly in a range of from more than 30° C. to about 80° C. while the operating temperature of the regenerator 136 is commonly more than 100° C., more commonly of at least about 110° C., more commonly of at least about 120° C., more commonly of at least about 130° C., more commonly of at least about 140° C., more commonly of at least about 150° C., and even more commonly of at least about 160° C. The operating temperature difference between the separator 138 and the regenerator 136 is commonly in the range of from about 5 to about 300, more commonly in the range of from about 50 to about 150° C., more commonly in the range of from about 75 to about 125° C. and more commonly in the range of from about 75 to about 100° C. When a pressure change is utilized to regenerate the sorbent in the regenerator 136, the (total) operating pressure in the separator 138 is commonly in a range of from about 1 to about 150 and even more commonly of from about 1 to about 80 atm while the operating pressure of the regenerator 136 is commonly in a range of from about 0.5 to about 100 and even more commonly of from about 1 to about 20 atm. When a pressure change is utilized the operating pressure difference between the separator 138 and the regenerator 136 is commonly in the range of from about 0.5 to about 80 and more commonly in the range of from about 0.5 to about 10 atm. In one configuration, a sweep gas, either steam or a mixture of steam and target gas component, is injected into the regenerator 136. In the case of the staged fluidized bed regenerator 136, the target gas component lean sorbent is extracted from the last stage 370*z* (where target gas component loading is lower than the other stages).

The fluidizing gases of the separator 138 and regenerator 136 are different. In the separator 128, the fluidizing gas is the gas stream 304 from which separation of the target gas component or some other constituent is desired. In the regenerator 136, the fluidizing gas is the target gas component, steam, an inert gas, or a combination thereof.

To control levels of sorbed acid gas and/or other acid and/or salt component on the sorbent, a bleed stream down corner 390, which can be either interior or exterior to the regenerator 136 vessel or both, withdraws a portion of the sorbent 394 from the regenerator 136 for further regeneration treatment. As noted, the target gas component lean sorbent 394 is contacted sequentially with the regeneration and wash solutions to form a fully regenerated sorbent for recycle to the separator 138. The fully regenerated sorbent is combined with the lean sorbent 204 for recycle to the gas component separator 138.

Figure 4:
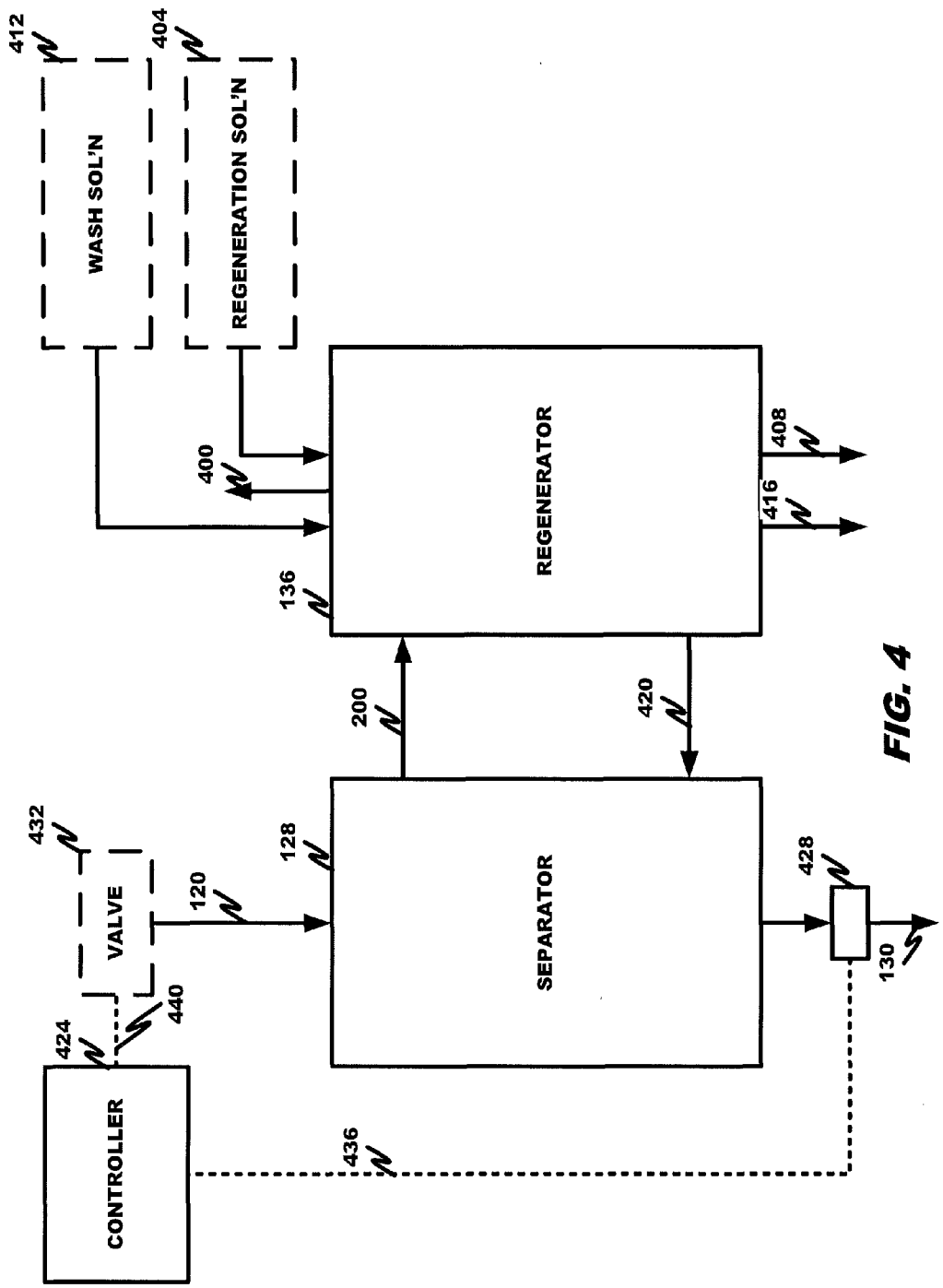
FIG. 4 is a block diagram of a regeneration system according to an embodiment of the disclosure.

A second example of this process will be discussed with reference to FIG. 4. The separator 128 and regenerator 136 may be operated continuously or discontinuously (e.g., batch operation). The treated gas stream 120 passes through the separator 128 containing the sorbent, which removes the target gas component and potentially collects acid from the treated gas stream 120 and/or salt derived therefrom on the sorbent surface. The loaded sorbent 200 is transferred continuously or discontinuously from the separator 128 to the regenerator 136 for target gas component and acid and/or salt removal.

Regeneration begins by thermally desorbing the target gas component from the loaded sorbent 200 under in the temperature regime discussed above, thereby forming a target gas component-containing fluid stream (which may be a liquid or gas stream) 400. The regeneration solution 404 is next optionally contacted, while in the regenerator 136, with the target gas component lean sorbent to remove most of the acid and/or salt deposits from the sorbent and form a contaminated regeneration solution 408. The partially treated sorbent is next optionally contacted, while in the regenerator 136, with the wash solution 412 to remove most of any remaining acid and/or salt deposits, base, and/or derivatives from the reaction of the acid and/or salt with the base from the partially treated sorbent surface to form a fully treated or regenerated sorbent 420 and a contaminated wash solution 416. As noted, the contaminates in the contaminated regeneration and wash solutions 408 and 416 can be removed prior to recycle to the regenerator 136 in the next regeneration cycle. The fully treated sorbent 420 is transferred continuously or discontinuously from the regenerator 136 to the separator 128 for target gas component removal from the treated gas stream 120.

A controller 424 is in electrical communication with a sensor 428 and a valve 432 via control lines 436 and 440. The controller 424 comprises regeneration instructions stored in a tangible and non-transient computer readable medium (not shown). The sensor 428 can detect a concentration or level of the target gas component in the purified gas stream 130. The sensor 428 can use any known technique for this detection, including a flame ionization detector, nondispersive infrared detector, photoionization detector, zirconium oxide sensor cell, catalytic sensor, metal oxide semiconductor sensor, thermal conductivity detector, electrochemical gas sensor, carbon dioxide sensor, carbon monoxide detector, holographic sensor, hydrogen sulfide sensor, nitrogen oxide sensor, sulfur oxide sensor, and the like. The valve 432 can enable or disable treated gas stream 120 flow to and through the separator 128. Flow can be disabled or blocked by the valve 432, for instance, when the sorbent has been moved to the regenerator 136. Some configurations remove only a portion of the loaded sorbent from the separator 128 for regeneration in the regenerator 136 and return fully treated sorbent 420 on a continuous or semi-continuous basis while the treated gas stream 120 passes through the separator 128. The regeneration instructions receive signals from the sensor 428 indicating an amount of the target gas component in the purified gas stream 130 and, based on the sensed amount, opens or closes the valve 432 to permit sorbent regeneration.

Figure 5:
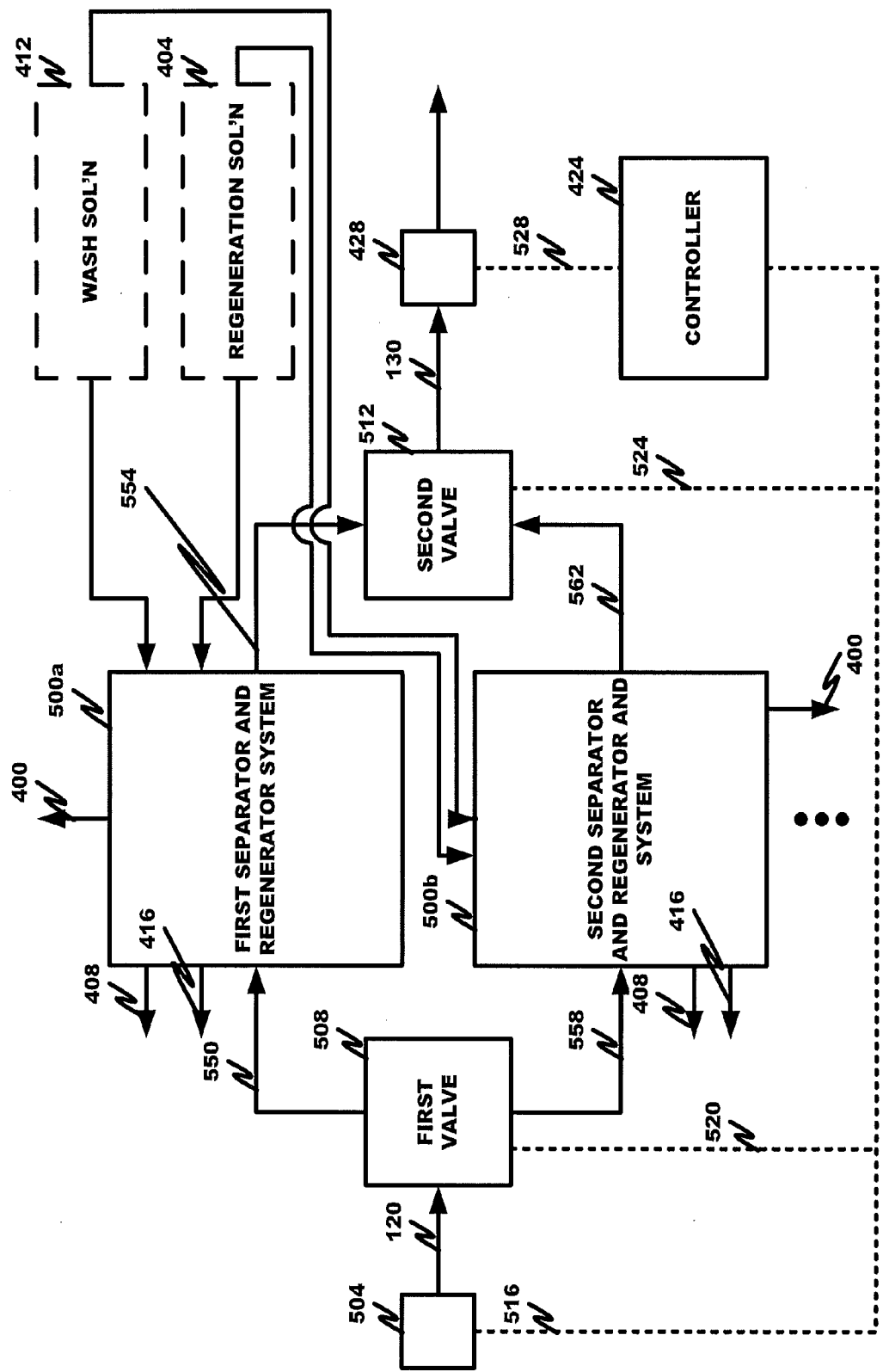
FIG. 5 is a block diagram of a regeneration system according to an embodiment of the disclosure.

A further example of this process will be discussed with reference to FIG. 5. The first and second separator and regenerator systems 500*a-b* may be operated continuously or discontinuously (e.g., batch operation). Although only one vessel may be used for both separation and regeneration, it is to be understood that multiple, separate vessels are typically used for separation and regeneration as described above. The treated gas stream 120 passes through a selected one of the separator and regenerator systems containing the sorbent, which removes the target gas component and potentially collects acid from the treated gas stream 120 and/or salt derived therefrom on the sorbent surface. Although the first and second separator and regenerator systems 500*a-b* can operate concurrently, they typically operate over discrete time intervals.

The controller 424 is in electrical communication with an upstream and downstream sensor 504 and 428, respectively, and first and second valves 508 and 512, respectively, via control lines 516, 520, 524, and 528. The controller 424 comprises regeneration instructions stored in a tangible and non-transient computer readable medium (not shown). The upstream sensor 504, like the downstream sensor 428, detects a concentration or level of the target gas component and/or acid gas in the purified gas stream 130. The upstream sensor 504, like the downstream sensor 428, can use any known technique for this detection. The first and second valves 508 and 512 can enable or disable treated gas stream 120 flow to and through either of the separator and regenerator systems 500*a,b*. Stated another way, the first and second valves 508 and 512 operate together to divert treated gas stream 120 flow to a selected one of the first and second separator and regenerator systems 500*a,b*, thereby bypassing the other of the first and second separator and regenerator systems 500*a,b*. The regeneration instructions receive signals from the upstream and downstream sensors 504 and 428 indicating an amount of the target gas component and/or acid gas in the treated gas stream 120 and purified gas stream 130, respectively, and, based on the sensed amount, sets the first and second valves 508 and 512 to direct gas flow to the desired separator and regenerator system.

In a first operating mode, the treated gas stream 120 follows first flow path 550 and 554 and passes through the first separator and regenerator system 500*a* while bypassing the second separator and regenerator system 500*b*. In this first operating mode, the sorbent in the bypassed second separator and regenerator system 500*b* is being regenerated as discussed above to remove the sorbed target gas component and acid and/or salt deposits from the sorbent surface.

In a second operating mode, the treated gas stream 120 follows first flow path 558 and 562 and passes through the second separator and regenerator system 500*b* while bypassing the first separator and regenerator system 500a. In this second operating mode, the sorbent in the bypassed first separator and regenerator system 500a is being regenerated as discussed above to remove the sorbed target gas component and acid and/or salt deposits from the sorbent surface.

The selection of the first or second operating modes is made by the controller 424 based on the detected levels of the target gas component and/or acid gas in the treated gas stream 120 and purified gas stream 130, respectively. Stated another way, when the detected levels of the target gas component and/or acid gas in the treated gas stream 120 and purified gas stream 130, respectively, indicate that at least a determined amount of the target gas component and/or acid gas is passing through the sorbent bed without being collected and therefore that the sorbent is at or near its collection capacity, the controller 424 operates the first and second valves 508 and 512 to terminate the first operating mode and initiate the second operating mode, thereby allowing the loaded sorbent in the first separator and regenerator system 500a to be regenerated fully. Likewise, when the detected levels of the target gas component and/or acid gas in the treated gas stream 120 and purified gas stream 130, respectively, indicate that at least a determined amount of the target gas component and/or acid gas is passing through the sorbent bed without being collected and therefore that the sorbent is at or near its collection capacity, the controller 424 operates the first and second valves 508 and 512 to terminate the second operating mode and initiate the first operating mode, thereby allowing the loaded sorbent in the second separator and regenerator system 500a to be regenerated fully.

In this way, a hybrid approach is provided where the sorbent may be regenerated in a continuous process, which may be bypassed when the sorbent is free from contamination.

Regeneration Logic

Figure 6:
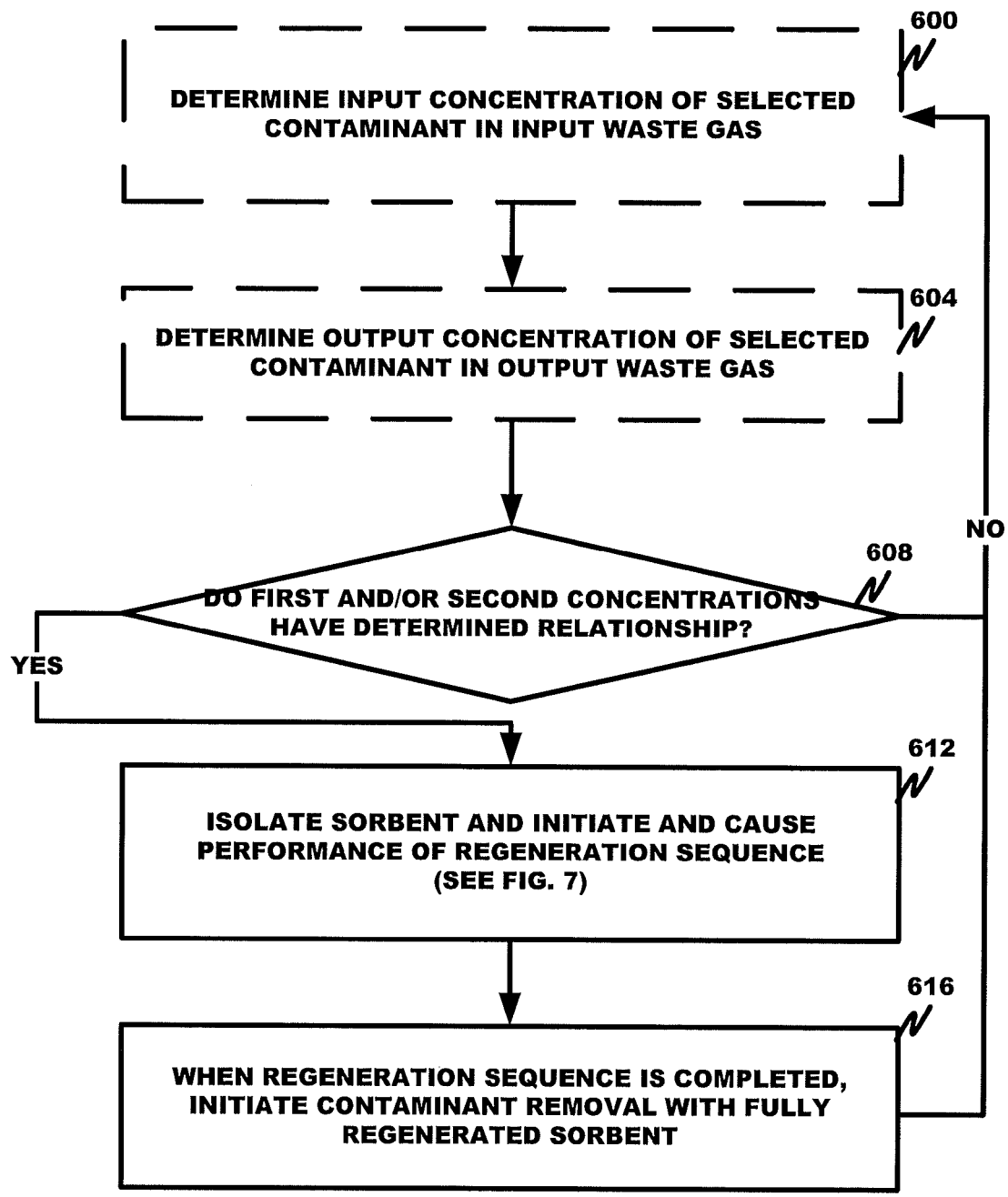
FIG. 6 is a flow chart of regeneration logic according to an embodiment of the disclosure.

The microprocessor executable (automated) regeneration logic of the controller 424 will now be discussed with reference to FIG. 6.

In optional step 600, the controller 424 determines an input concentration of a selected contaminant (e.g., either or both of the target gas component and acid gas) in the input waste gas (e.g., the treated gas stream 120).

In step 604, the controller 424 determines an input concentration of a selected contaminant (e.g., either or both of the target gas component and acid gas) in the output waste gas (e.g., the purified gas stream 130).

In decision diamond 608, the controller 424 determines whether the first and second contaminant concentrations have a determined relationship with respect to one another. The determined relationship can take many forms. In one form, the controller 424 uses the first (input) and second (output) contaminant concentrations to determine when the sorbent is at or near its collection capacity. When at or near capacity, the determined relationship is deemed to exist. In another form, the controller 424 uses the second contaminant concentration alone. When the second contaminant concentration is at or above a selected level, the determined relationship is deemed to exist. In another form, the controller 424 uses the first contaminant concentration alone to determine an amount of contaminant contacting the sorbent bed. When the amount indicates the sorbent is at or near its collection capacity, the determined relationship is deemed to exist. Other relationships may be used as will be appreciated by one of ordinary skill in the art.

When the determined relationship is deemed to exist, the controller 424 isolates the sorbent bed and initiates the regeneration sequence (e.g., as described in FIG. 7) (step 612). In the system of FIG. 5, this means, for example, entering the second operating mode from the first operating mode or vice versa.

When the regeneration sequence is completed, the controller 424 initiates contaminate removal with the regenerated sorbent (step 616). In the system of FIG. 5, this means, for example, re-entering the first operating mode from the second operating mode or vice versa. In other applications, the first operating mode is re-entered after the sorbent is fully regenerated and when the determined relationship is deemed to exist.

When the determined relationship is not deemed to exist or after step 616, the controller returns to step 600.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

The regeneration system of this disclosure was tested at the laboratory-scale to determine the thermal stability of an amine-based ion-exchange resin.

The first step was to develop $CO_2$ isotherms to understand the effect of using different regeneration temperatures. The isotherms were measured using a Pyris 1 thermogravimentric analyzer (TGA) at five $CO_2$ partial pressures (0.0.4, 0.081, 0.15, 0.5, and 0.81 bar). Using the experimentally collected information, Langmuir isotherms were used to calculate $CO_2$ loadings at partial pressures not measured. The $CO_2$ isotherms for on amine functionalized ion-exchange resin are provided in FIG. 8. One proposed adsorption condition would be a temperature of 40° C. and a $CO_2$ partial pressure of 0.15 bar (marked on FIG. 8 as "Adsorption Condition 1"). Under these conditions the amine functionalized ion exchange resin clearly adsorbs a significant amount of $CO_2$ (i.e. 10.5 g $CO_2$/100 g fresh sorbent). As is shown in FIG. 8, at the same partial pressure a lower temperature results in a greater $CO_2$ loading. However, a greater $CO_2$ loading does not always result in a lower cost for $CO_2$ capture, which is the most important consideration.

Similarly, the regeneration conditions can be proposed. The regeneration $CO_2$ partial pressure is 0.81 bar. In one case (labeled "regeneration condition 1") the sorbent is regenerated at 100° C. and in another case (labeled "regeneration condition 2") the sorbent is regenerated at 120° C.

As stated previously, under the adsorption conditions (40° C. and 0.15 bar partial pressure $CO_2$) the equilibrium loading of the sorbent is approximately 10.5 g $CO_2$/100 g fresh sorbent. If regeneration condition 1 (100° C. and 0.81 bar partial pressure $CO_2$) is used the equilibrium $CO_2$ loading is approximately 5.5 g $CO_2$/100 g fresh sorbent and the difference between the adsorption and regeneration loadings (i.e. working capacity) is approximately 5 g $CO_2$/100 g fresh sorbent. If regeneration condition 2 (120° C. and 0.81 bar partial pressure $CO_2$) is used the equilibrium $CO_2$ loading is approximately 3.5 g $CO_2$/100 g fresh sorbent and the difference between the adsorption and regeneration loadings (i.e. working capacity) is approximately 7 g $CO_2$/100 g fresh sorbent. The $CO_2$ working capacity is linearly related to the energy penalty associated with $CO_2$ capture. Therefore, for the overall $CO_2$ capture process, it is highly advantageous to use the sorbent in such a way where the maximum $CO_2$ working capacity is achieved.

However, the regeneration temperature for supported amine sorbents cannot be increased freely because it has been well documented that amines will degrade at temperatures at or above 160° C. In addition, slow degradation may occur at lower temperatures. For post-combustion $CO_2$ capture the act of balancing the cost savings from a reduced energy penalty with the cost of more frequent sorbent replacement can be important. To determine the temperature at which one amine functionalized ion exchange resin started to degrade, a TGA experiment was designed as follows. For this test, the adsorption condition was set to (40° C. and 0.15 bar partial pressure of $CO_2$). The regeneration $CO_2$ partial pressure was set to 0.81 bar. The sorbent was then cycled for five adsorption/regeneration cycles. This was completed at the following regeneration temperatures: 120, 130, 140, 150, 160, and 170° C. The results from these tests are provided in FIG. 9. Linear trendlines have been included for each regeneration temperature. A negative slope indicates a loss in the $CO_2$ delta loading over the five cycles.

Negative slopes were observed for the experiments where regeneration was conducted at temperatures greater than or equal to 140° C. However, for the 140° C. and 150° C. tests the magnitude of the slope was small, indicating that the rate of degradation was slow. For the tests completed at 120° C. and 130° C. the slope of the line was positive, meaning that no significant degradation occurred.

Based on these experiments a much longer test was completed using a regeneration temperature of 120° C. Over the ~90 cycle (i.e. 360 hour) test, the delta $CO_2$ loading did not decrease significantly.

The regeneration system of this disclosure was tested at the laboratory-scale to determine the ability of a regeneration solution to remove heat stable salts from an amine-based sorbent.

The first step was to expose $CO_2$ sorbents to $SO_2$. Approximately 2.0 g of sorbent was placed into a quartz fixed bed reactor and the reactor was placed into the fume hood. Then, 1% $SO_2$ in nitrogen was run through the tube for 980 minutes at a 100 mL/min flow rate, allowing 98 L of total gas exposure. Once the gas was shut off, nitrogen was run through the set-up as to flush out $SO_2$ in the tubes and minimize risk of exposure.

To make the solution to remove the heat stable salt ("HSS") 4.24 g (see calculation 1) of $Na_2CO_3$ was placed in 75 mL of de-ionized (DI) water and placed on a stir plate for 5 minutes until all solid had dissolved. The pH was measured to be 12 (i.e. highly basic). Next, the sorbent were added to the mixture and left to mix on the stir plate for 1 hour. After this time had elapsed, the sorbent was filtered out of the solution and rinsed with DI water. It was assumed that one rinse would not be sufficient to fully remove all remnants of the $Na_2CO_3$ solution so the sorbent was placed into a beaker with a stir bar and water and left to stir for intervals of 15 minutes, after which it was filtered and then stirred with fresh DI water for another 15 minutes. This rinsing process was completed three 3 times after which the solution reached a pH of close to 7 (i.e. neutral).

Test results therefore establish the disclosed system can return the $CO_2$ sorbent to neutral pH levels. This can achieve the goal of extending sorbent life, thereby reducing operational costs.

A number of variations and modifications of the disclosure can be used. It would be possible to provide for some features of the disclosure without providing others.

For example in one alternative embodiment, automated control logic simply performs regeneration at determined times, regardless of a remaining capacity of the sorbent to remove the target gas component.

In another alternative embodiment, less automated control logic is employed as one or more of the steps is performed manually.

The present disclosure, in various aspects, embodiments, and configurations, includes components, methods, processes, systems and/or apparatus substantially as depicted and described herein, including various aspects, embodiments, configurations, subcombinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   contacting an ion-exchange resin with a target component-containing gas stream, wherein the target component-containing gas stream further comprises at least one acid gas, the at least one acid gas being different from the target gas component;
   absorbing at least a portion of the target component from the target component-containing gas stream onto the ion-exchange resin at an absorption temperature of at least 20° C. to form a target component-loaded resin, wherein the target component-loaded resin comprises at least one acid gas and/or a salt thereof removed from the target component-containing gas stream;

regenerating the target component loaded resin to form a regenerated ion-exchange resin, wherein the regenerating step comprises;

removing, at a sorbent regeneration temperature of at least about 120° C., at least most of the removed target gas component from the target component-loaded resin to form a lean ion exchange resin, the lean ion exchange resin comprising the at least one acid gas and/or a salt thereof;

contacting the lean ion exchange resin with a regeneration solution to remove, from the lean ion exchange resin, at least most of the at least one acid gas and/or a salt thereof and form the regenerated ion-exchange resin; and recycling the regenerated ion-exchange resin to the contacting.

2. The method of claim 1, wherein the target component is carbon dioxide, wherein the acid gas comprises one or more of a sulfur oxide, a nitrogen oxide and hydrogen sulfide, and wherein the ion exchange resin is an amine functionalized ion-exchange resin.

3. The method of claim 2, wherein the ion-exchange resin is in the form of bead polymers formed of a polystyrene polymer resin comprising primary amines and cross-linked via divinylaromatics or monodisperse or heterodisperse and macroporous or gel-type (microporous) resin.

4. The method of claim 1, wherein the target component is carbon dioxide, wherein the ion-exchange resin is an amine-based ion-exchange resin, and wherein the absorption temperature is at least about 30° C.

5. The method of claim 4, wherein the ion-exchange resin is a weakly basic, polystyrene-based ion-exchange resin functionalized with primary amine groups comprising benzylamine, wherein the absorption temperature is at least about 35° C., and wherein the target component is carbon dioxide.

6. The method of claim 5, wherein the absorption temperature is at least about 40° C.

7. The method of claim 6, wherein the absorption temperature is at least about 50° C. and wherein the sorbent regeneration temperature is about 140° C. or more.

8. The method of claim 1, wherein the ion-exchange resin is a weakly basic, polystyrene-based ion-exchange resin functionalized with primary amine groups comprising benzylamine and wherein, in the contacting, the target component-containing gas stream is contacted with a sorbent comprising one or more of activated carbon, zeolite, clay, fly ash, or a metal-containing sorbent, wherein the metal in the metal-containing sorbent is one or more metals from IUPAC Groups 3 through 12 of the Periodic Table of Elements.

9. The method of claim 1, wherein the target gas component is a carbon oxide, wherein the at least one acid gas is one or more of a sulfur oxide, a nitrogen oxide and hydrogen sulfide, and wherein the regeneration solution has a pH of at least about pH 10.

10. The method of claim 9, wherein the acid gas comprises $SO_2$, wherein the target gas component is $CO_2$, wherein the regeneration solution comprises a base, wherein at least most of the $CO_2$ in the received gas stream is removed by the ion-exchange resin, wherein $CO_2$ is removed from the target component-loaded ion-exchange resin by a combination of temperature and pressure swing, and wherein the ion-exchange resin is in the form of a solid.

11. The method of claim 1, wherein bonds between the between adjacent ion-exchange resin components and between the ion-exchange resin component and an adjacent ion-exchange resin substrate are stronger than bonds between the ion-exchange resin component and the target gas component and between the ion-exchange resin component and the at least one acid gas and/or salt thereof and wherein bonds between the between adjacent ion-exchange resin components and between the ion-exchange resin component and an adjacent ion-exchange resin substrate are thermally stable under the temperatures of the contacting and regenerating steps.

12. The method of claim 11, wherein the regeneration solution does not significantly impact the strengths of the bonds between the between adjacent ion-exchange resin components and between the ion-exchange resin component and an adjacent ion-exchange resin substrate.

13. The method of claim 12, wherein the regeneration solution comprises a base that is at least one of an alkali or alkaline earth metal carbonate, at least one of an alkali or alkaline earth metal hydroxide, an alkoxide, a metal oxide, ammonia, a metal amine, a carboxylate, a phosphine, an ether, a ketone, an alkene, and $CH_3^-$.

14. The method of claim 1, further comprising:
after contact of the lean ion-exchange resin with the regeneration solution, contacting the ion-exchange resin with a wash solution to remove any deposit on the ion-exchange resin after contact with the regeneration solution.

15. A method, comprising:
contacting an ion-exchange resin with a target component-containing gas stream, wherein the ion-exchange resin is an amine-based ion-exchange resin and wherein the target component-containing gas stream further comprises at least one acid gas, the at least one acid gas being different from the target gas component;

absorbing at least a portion of the target component from the target component-containing gas stream onto the ion-exchange resin at an absorption temperature of at least 20° C. to form a target component-loaded resin, wherein the target component-loaded resin comprises at least one acid gas and/or a salt thereof removed from the target component-containing gas stream;

regenerating the target component loaded resin to form a regenerated ion-exchange resin, wherein the regenerating step comprises the sub-steps:

removing, at a sorbent regeneration temperature of at least about 120° C., at least most of the removed target gas component from the target component-loaded ion exchange-resin to form a lean ion-exchange resin, the lean ion-exchange resin comprising the at least one acid gas and/or a salt thereof; and contacting the lean ion-exchange resin with a regeneration solution to remove, from the lean ion-exchange resin, at least most of the at least one acid gas and/or a salt thereof and form the regenerated ion-exchange resin; and recycling the regenerated ion-exchange resin to the ion-exchange resin contacting step.

16. The method of claim 15, wherein the target component is carbon dioxide, wherein the acid gas comprises one or more of a sulfur oxide, a nitrogen oxide and hydrogen sulfide, and wherein the ion exchange resin is an amine functionalized ion-exchange resin.

17. The method of claim 16, wherein the ion-exchange resin is in the form of bead polymers formed of a polystyrene polymer resin comprising primary amines and crosslinked via divinylaromatics or monodisperse or heterodisperse and macroporous or gel-type (microporous) resin, and wherein the sorbent regeneration temperature is at least about 140° C.

18. The method of claim 15, wherein the target component is carbon dioxide, and wherein the absorption temperature is at least about 30° C. and wherein the sorbent regeneration temperature is more than about 160° C.

19. The method of claim 18, wherein the ion-exchange resin is a weakly basic, polystyrene-based ion-exchange resin functionalized with primary amine groups comprising benzylamine, wherein the absorption temperature is at least about 35° C., and wherein the target component is carbon dioxide.

20. The method of claim 19, wherein the absorption temperature is at least about 40° C.

21. The method of claim 20, wherein the absorption temperature is at least about 50° C. and wherein the sorbent regeneration temperature is about 140° C. or more.

22. The method of claim 15, wherein the ion-exchange resin is a weakly basic, polystyrene-based ion-exchange resin functionalized with primary amine groups comprising benzylamine and wherein, in the contacting step, the target component-containing gas stream is contacted with a sorbent comprising one or more of activated carbon, zeolite, clay, fly ash, or a metal-containing sorbent, wherein the metal in the metal-containing sorbent is one or more metals from IUPAC Groups 3 through 12 of the Periodic Table of Elements.

23. The method of claim 15, wherein the target gas component is a carbon oxide, wherein the at least one acid gas is one or more of a sulfur oxide, a nitrogen oxide and hydrogen sulfide, and wherein the regeneration solution has a pH of at least about pH 10.

24. The method of claim 23, wherein the acid gas comprises $SO_2$, wherein the target gas component is $CO_2$, wherein the regeneration solution comprises a base, wherein at least most of the $CO_2$ in the received gas stream is removed by the ion exchange resin, wherein $CO_2$ is removed from the target component-loaded ion-exchange resin by a combination of temperature and pressure swing, and wherein the ion-exchange resin is in the form of a solid.

25. The method of claim 15, wherein bonds between the between adjacent ion-exchange resin components and between the ion-exchange resin component and an adjacent ion-exchange resin substrate are stronger than bonds between the ion-exchange resin component and the target gas component and between the ion-exchange resin component and the at least one acid gas and/or salt thereof and wherein bonds between the between adjacent ion-exchange resin components and between the ion-exchange resin component and an adjacent ion-exchange resin substrate are thermally stable under the temperatures of the contacting and regenerating steps.

26. The method of claim 25, wherein the regeneration solution does not significantly impact the strengths of the bonds between the between adjacent ion-exchange resin components and between the ion-exchange resin component and an adjacent ion-exchange resin substrate.

27. The method of claim 26, wherein the regeneration solution comprises a base that is at least one of an alkali or alkaline earth metal carbonate, at least one of an alkali or alkaline earth metal hydroxide, an alkoxide, a metal oxide, ammonia, a metal amine, a carboxylate, a phosphine, an ether, a ketone, an alkene, and $CH_3^-$.

28. The method of claim 15, further comprising:
after contact of the lean ion-exchange resin with the regeneration solution, contacting the ion-exchange resin with a wash solution to remove any deposit on the ion-exchange resin after contact with the regeneration solution.

29. A method, comprising:
contacting an ion-exchange resin with a target component-containing gas stream, wherein the ion-exchange resin is an amine-based ion-exchange resin, wherein the ion exchange resin is in the form of bead polymers formed of a polystyrene polymer resin comprising primary amines and cross-linked via divinylaromatics or monodisperse or heterodisperse and macroporous or gel-type (microporous) resin, and wherein the target component-containing gas stream further comprises at least one acid gas, the at least one acid gas being different from the target gas component;
absorbing at least a portion of the target component from the target component-containing gas stream onto the ion-exchange resin at an absorption temperature of at least 20° C. to form a target component-loaded resin, wherein the target component-loaded resin comprises at least one acid gas and/or a salt thereof removed from the target component-containing gas stream;
regenerating the target component-loaded resin by removing, from the target component-loaded resin, the target component while leaving the at least one acid gas and/or salt thereof on the resin, at a sorbent regeneration temperature of at least about 120° C. to form a lean ion-exchange resin, the lean ion-exchange resin comprising the at least one acid gas and/or a salt thereof;
contacting the lean ion-exchange resin with a regeneration solution to remove, from the lean ion-exchange resin, at least most of the at least one acid gas and/or a salt thereof and form a regenerated ion-exchange resin;
after contact of the lean ion-exchange resin with the regeneration solution, contacting the regenerated ion-exchange resin with a wash solution to remove any deposit on the regenerated ion-exchange resin after contact with the regeneration solution; and
recycling the regenerated ion-exchange resin to the step of contacting the ion-exchange resin with the target component-containing gas stream.

* * * * *